US012737179B2

(12) United States Patent
Wu et al.

(10) Patent No.: US 12,737,179 B2
(45) Date of Patent: Sep. 15, 2026

(54) SDK REPAIR METHOD AND APPARATUS, TERMINAL, DEVICE, SYSTEM, AND MEDIUM

(71) Applicant: CHINA UNIONPAY CO., LTD., Shanghai (CN)

(72) Inventors: Wenchuan Wu, Shanghai (CN); Ji Xia, Shanghai (CN); Xi Shen, Shanghai (CN); Zhixiong Tang, Shanghai (CN); Qiang Liu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 19/106,201

(22) PCT Filed: Mar. 6, 2023

(86) PCT No.: PCT/CN2023/079809

§ 371 (c)(1),
(2) Date: Feb. 24, 2025

(87) PCT Pub. No.: WO2024/040916

PCT Pub. Date: Feb. 29, 2024

(65) Prior Publication Data

US 2026/0003610 A1 Jan. 1, 2026

(30) Foreign Application Priority Data

Aug. 26, 2022 (CN) ......................... 202211035360.6

(51) Int. Cl.
*G06F 8/71* (2018.01)
*G06F 8/36* (2018.01)
(Continued)

(52) U.S. Cl.
CPC .................. *G06F 8/71* (2013.01); *G06F 8/36* (2013.01); *G06F 8/65* (2013.01)

(58) Field of Classification Search
CPC ..... G06F 8/71; G06F 8/36; G06F 8/65; G06F 8/70
See application file for complete search history.

(56) References Cited

U.S. PATENT DOCUMENTS 10,579,803 B1 * 3/2020 Mueller ................ G06F 21/577
2005/0044389 A1 2/2005 Oliphant
(Continued)

FOREIGN PATENT DOCUMENTS

CN 108121655 A 6/2018
CN 113591079 A 11/2021
(Continued)

OTHER PUBLICATIONS

The World Intellectual Property Organization (WIPO) International Search Report for PCT/CN2023/079809 May 29, 2023 5 Pages (including translation).

*Primary Examiner* — Daxin Wu
(74) *Attorney, Agent, or Firm* — Anova Law Group, PLLC

(57) ABSTRACT

The disclosure describes an SDK repair method and apparatus, a terminal, a device, a system, and a medium. The method includes obtaining SDK information, host information and SDK anomaly information of different anomaly types; determining an anomaly impact index corresponding to each anomaly type of a target SDK according to the SDK information, the host information, and the SDK anomaly information of each anomaly type, where the target SDK corresponds to a host program indicated by the host information and an SDK version indicated by the SDK information; obtaining a target SDK repair policy according to the anomaly impact index corresponding to each anomaly type of the target SDK and a preset anomaly grading processing rule; and delivering the target SDK repair policy to a user
(Continued)

terminal, so that the user terminal executes the target SDK repair policy to repair the target SDK.

20 Claims, 8 Drawing Sheets

(51) Int. Cl.
*G06F 8/65* (2018.01)
*G06F 8/70* (2018.01)

(56) References Cited

U.S. PATENT DOCUMENTS

| | | | | |
|---|---|---|---|---|
| 2018/0011700 | A1 * | 1/2018 | Plate | G06F 8/65 |
| 2021/0119858 | A1 * | 4/2021 | De Smet | G06F 8/61 |
| 2021/0273968 | A1 * | 9/2021 | Shaieb | G06F 8/65 |
| 2022/0012044 | A1 * | 1/2022 | Renke | G06F 8/656 |
| 2023/0097733 | A1 * | 3/2023 | Nelson | G06F 21/577 726/25 |
| 2023/0099153 | A1 * | 3/2023 | Allen | G06Q 10/06313 705/7.23 |

FOREIGN PATENT DOCUMENTS

| | | | | |
|---|---|---|---|---|
| CN | 113961226 A | * | 1/2022 | G06F 8/656 |
| CN | 113986622 A | | 1/2022 | |
| CN | 115543404 A | | 12/2022 | |

* cited by examiner

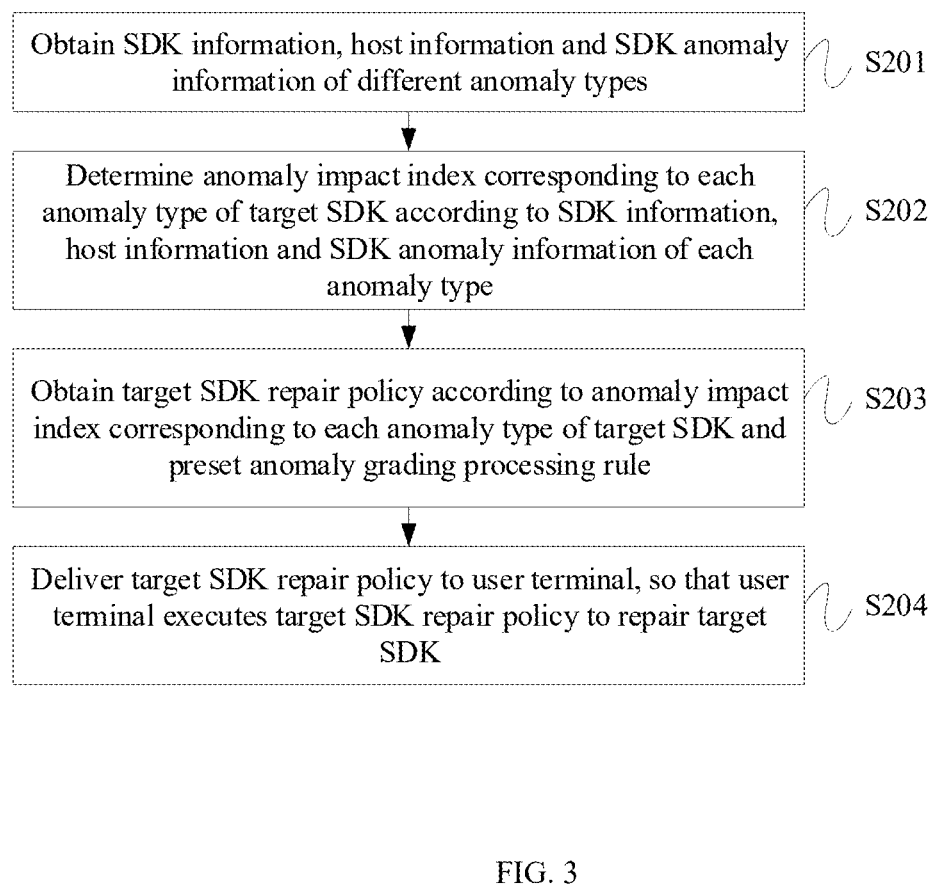

Obtain SDK information, host information and SDK anomaly information of different anomaly types — S201

Determine anomaly impact index corresponding to each anomaly type of target SDK according to SDK information, host information and SDK anomaly information of each anomaly type — S202

Obtain target SDK repair policy according to anomaly impact index corresponding to each anomaly type of target SDK and preset anomaly grading processing rule — S203

Deliver target SDK repair policy to user terminal, so that user terminal executes target SDK repair policy to repair target SDK — S204

FIG. 3

SDK REPAIR METHOD AND APPARATUS, TERMINAL, DEVICE, SYSTEM, AND MEDIUM

CROSS-REFERENCE TO RELATED APPLICATION

This application is a national phase entry under 35 U.S.C. § 371 of International Application No. PCT/CN2023/079809, filed on Mar. 6, 2023, which claims priority to Chinese Patent Application No. 202211035360.6 entitled "SDK REPAIR METHOD AND APPARATUS, TERMINAL, DEVICE, SYSTEM, AND MEDIUM," filed on Aug. 26, 2022, the entire content of all of which is incorporated herein by reference.

FIELD OF THE DISCLOSURE

The disclosure generally relates to the field of data processing technology and, more particularly, relates to a method, apparatus, terminal, device, system and medium for repairing an SDK.

BACKGROUND

Software development kit (SDK) is a toolkit that provides certain functions for a software framework, hardware platform, operating system or application. SDK may be embedded in hosts such as software frameworks, hardware platforms, operating systems or applications of different content providers. When SDK runs with a host, the SDK may cause anomalies and the SDK needs to be repaired so that it may run normally.

However, due to the differences in development methods and host environments of different content providers, the defects in the SDK may also be different. A single repair of the SDK is difficult to meet the repair needs of the SDKs of different content providers.

SUMMARY

The embodiments of the disclosure provide a method, apparatus, terminal, device, system and medium for repairing an SDK, which may meet the repair requirements of SDKs of different content providers.

In a first aspect, embodiments of the disclosure provide an SDK repair method, which is applied to a repair platform, the method including: obtaining SDK information, host information and SDK anomaly information of different anomaly types; determining an anomaly impact index corresponding to each anomaly type of a target SDK according to the SDK information, the host information, and the SDK anomaly information of each anomaly type, where the target SDK corresponds to a host program indicated by the host information and an SDK version indicated by the SDK information; obtaining a target SDK repair policy according to the anomaly impact index corresponding to each anomaly type of the target SDK and a preset anomaly grading processing rule, where the target SDK repair policy includes an SDK repair policy, in the anomaly grading processing rule, with an anomaly level corresponding to an anomaly impact index; and delivering the target SDK repair policy to a user terminal, so that the user terminal executes the target SDK repair policy to repair the target SDK.

In a second aspect, embodiments of the disclosure provide an SDK repair method, which is applied to a user terminal, and the method includes: providing SDK information, host information and SDK anomaly information of different anomaly types to a repair platform, so that the repair platform obtains a target SDK repair policy according to an anomaly impact index corresponding to each anomaly type of a target SDK and a preset anomaly grading processing rule, where the target SDK repair policy includes an SDK repair policy, in the anomaly grading processing rule, with an anomaly level corresponding to an anomaly impact index, the target SDK corresponds to a host program indicated by the host information and an SDK version indicated by the SDK information, and the anomaly impact index corresponding to each anomaly type of the target SDK is obtained according to the SDK information, the host information and SDK anomaly information of each anomaly type; and obtaining the target SDK repair policy from the repair platform, and execute the target SDK repair policy to repair the target SDK.

In a third aspect, embodiments of the disclosure provide an SDK repair apparatus, which is applied to a repair platform, and the apparatus includes: an acquisition module, configured to obtain SDK information, host information and SDK anomaly information of different anomaly types; a calculation module, configured to determine an anomaly impact index corresponding to each anomaly type of a target SDK according to the SDK information, the host information, and the SDK anomaly information of each anomaly type, where the target SDK corresponds to a host program indicated by the host information and an SDK version indicated by the SDK information; a policy configuration module, configured to obtain a target SDK repair policy according to the anomaly impact index corresponding to each anomaly type of the target SDK and a preset anomaly grading processing rule, where the target SDK repair policy includes an SDK repair policy, in the anomaly grading processing rule, with an anomaly level corresponding to an anomaly impact index; and a delivery module, configured to deliver the target SDK repair policy to the user terminal, so that the user terminal executes the target SDK repair policy to repair the target SDK.

In a fourth aspect, embodiments of the disclosure provide a user terminal, including: a transmission module, configured to provide a repair platform with SDK information, host information, and SDK anomaly information of different anomaly types, so that the repair platform obtains a target SDK repair policy according to an anomaly impact index corresponding to each anomaly type of the target SDK and a preset anomaly grading processing rule, where the target SDK repair policy includes an SDK repair policy, in the anomaly grading processing rule, with an anomaly level corresponding to an anomaly impact index, the target SDK corresponds to a host program indicated by the host information and an SDK version indicated by the SDK information, and the anomaly impact index corresponding to each anomaly type of the target SDK is obtained according to the SDK information, the host information, and the SDK anomaly information of each anomaly type; a receiving module, configured to obtain the target SDK repair policy from the repair platform; and an execution module, configured to execute the target SDK repair policy to repair the target SDK.

In a fifth aspect, embodiments of the disclosure provide an electronic device applied to a repair platform, the electronic device including: a processor and a memory storing computer program instructions, where, when the processor executes the computer program instructions, the SDK repair method of the first aspect is implemented.

In a sixth aspect, embodiments of the disclosure provide a user terminal, including: a processor and a memory storing computer program instructions, where, when the processor executes the computer program instructions, the SDK repair method of the second aspect is implemented.

In a seventh aspect, embodiments of the disclosure provide an SDK repair system, including: a repair platform, configured to execute the SDK repair method of the first aspect; and a user terminal, configured to execute the SDK repair method of the second aspect.

In an eighth aspect, embodiments of the disclosure provide a computer-readable storage medium, storing computer program instructions that, when executed by a processor, cause the processor to implement the SDK repair method of the first aspect or the SDK repair method of the second aspect.

The embodiments of the disclosure provide a method, apparatus, terminal, device, system and medium for repairing SDK. The repair platform may obtain an anomaly impact index characterizing the impact of an anomaly type on the SDK according to the SDK information, host information and the collected SDK anomaly information of different anomaly types, so as to obtain an SDK repair policy corresponding to the anomaly level and send the SDK repair policy to a user terminal according to the anomaly impact index corresponding to each anomaly type and a preset anomaly grading processing rule. The user terminal may execute the SDK repair policy corresponding to the anomaly level to repair the SDK. Different host information corresponds to different host programs, different host programs correspond to different content providers, and different versions of SDK also correspond to different SDK information. Different versions of SDK embedded in the host programs of different content providers generate different SDK anomaly information. Through the collected SDK anomaly information, the SDK repair policy corresponding to the anomaly level of each version of the SDK embedded in the host program of each content provider may be obtained, that is, the SDK repair policies for the different versions of SDK embedded in the host programs of different content providers may be automatically allocated to meet the repair needs of the SDK of different content providers.

BRIEF DESCRIPTION OF THE DRAWINGS

In order to more clearly illustrate the technical solution of the embodiments of the disclosure, the following is a brief introduction to the drawings essential for understanding the embodiments of the disclosure. For a person skilled in the art, other drawings may be obtained according to these drawings without making creative efforts.

FIG. 3 is a flowchart of an SDK repair method, according to embodiments of the first aspect of the disclosure;

FIG. 7 is a flowchart of another SDK repair method, according to embodiments of the second aspect of the disclosure;

DETAILED DESCRIPTION

The features and exemplary embodiments of various aspects of the disclosure will be described in detail hereinafter. In order to make the purpose, technical solutions and advantages of the disclosure clearer, the disclosure will be further described in detail below in conjunction with the accompanying drawings and specific embodiments. It should be understood that the specific embodiments described herein are merely intended to explain the disclosure, rather than to limit the disclosure. For those skilled in the art, the disclosure may be implemented without the need for some of these specific details. The following description of the embodiments is merely to provide a better understanding of the disclosure by illustrating the examples of the disclosure.

SDK is a toolkit that provides certain functions for a software framework, hardware platform, operating system or application. SDK may be embedded in a host such as a software framework, a hardware platform, an operating system or an application of different content providers. When the SDK runs together with the host, an anomaly may occur, and the SDK needs to be repaired so that the SDK may run normally. However, due to the differences in the development methods and host environments of different content providers, the defects of the SDK may also be different. A single repair of the SDK is difficult to meet the repair needs of the SDK of different content providers.

The disclosure provides a method, apparatus, terminal, device, system and medium for repairing an SDK. The repair platform may obtain an anomaly impact index that may characterize the impact of an anomaly type on the SDK according to the SDK information, host information and the collected SDK anomaly information of different anomaly types. The repair platform then obtains an SDK repair policy corresponding to an anomaly level according to the anomaly impact index corresponding to each anomaly type and a preset anomaly grading processing rule, and sends the SDK repair policy to a user terminal. The user terminal may execute the SDK repair policy with the anomaly level to repair the SDK. Different content providers have different host information, different versions of SDK have different SDK information, and different content providers and different versions of SDK have different SDK anomaly information. Through various information, an SDK repair policy corresponding to the anomaly level of each content provider and each version of SDK may be obtained, that is, different content providers and different versions of SDK may obtain an adapted SDK repair policy, which may meet the repair needs of the SDKs of different content providers.

Figure 1:
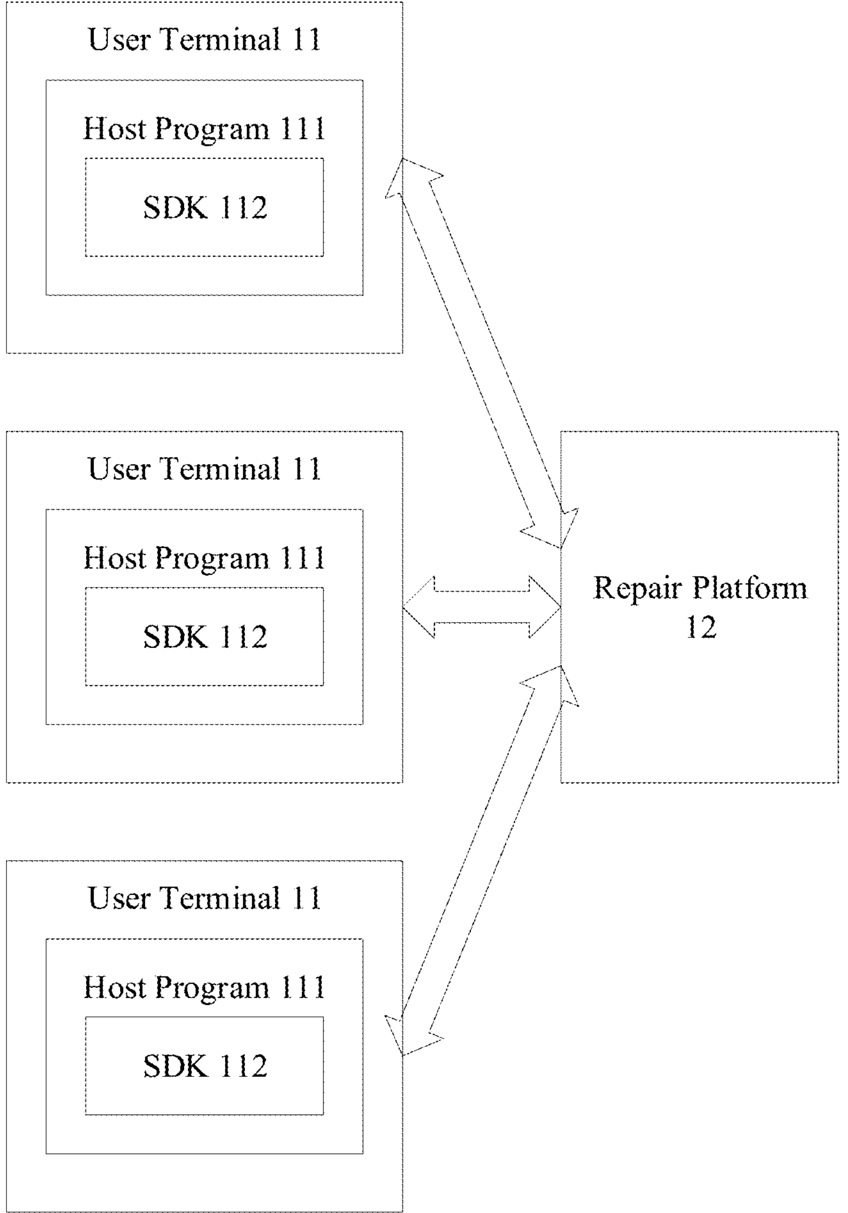
FIG. 1 is a schematic diagram of an example application scenario of an SDK repair method, according to some embodiments of the disclosure.

The SDK repair methods disclosed herein may be applied to scenarios of SDK repair, and may involve a repair platform and a user terminal. FIG. 1 is a schematic diagram of an example application scenario of an SDK repair method, according to some embodiments of the disclosure. As shown in FIG. 1, a user terminal 11 may communicate and interact with the repair platform 12.

The user terminal 11 has at least one host program 111 and at least one SDK 112. The same user terminal may have multiple different host programs 111, and different host programs 111 correspond to different content providers. SDK 112 may be embedded in a host program 111, and the host program 111 may call SDK 112 to use the functions provided by SDK 112. The user terminal 11 may specifically be a mobile phone, a tablet, an electronic computer, a smart wearable device, etc., which are not limited here. SDK 112 may provide SDK information of SDK 112, SDK anomaly information, and host information of the host program 111 where SDK 112 is located to the repair platform 12 as an information provider. As a repair object, the user terminal 11 may obtain a target SDK repair policy from the repair platform 12, and execute the SDK repair policy to repair SDK 112.

The repair platform 12 may be a backend system for providing SDK repair services for user terminals, and may include more than one electronic device. An electronic device may include a device such as a server, a gateway, a router, etc., and the type and number of electronic devices in the repair platform 12 are not limited here. The repair platform 12 may provide SDK repair services for multiple user terminals 11. The host programs 111 in different user terminals may be the same or different. The repair platform 12 may maintain the corresponding relationship between different content providers, host programs, users, SDKs, SDK anomaly information, and SDK repair policies, and may classify and summarize the anomaly types of SDK anomalies, and perform actions such as generating alarms and prompts. The repair platform 12 may deliver targeted repair policies to different user terminals 11 for an SDK 112 that needs to be repaired in the user terminals 11. The repair platform 12 may deliver targeted repair policies to user terminals in the form of full dose, grayscale release, and specified users, which are not limited here.

Figure 2:
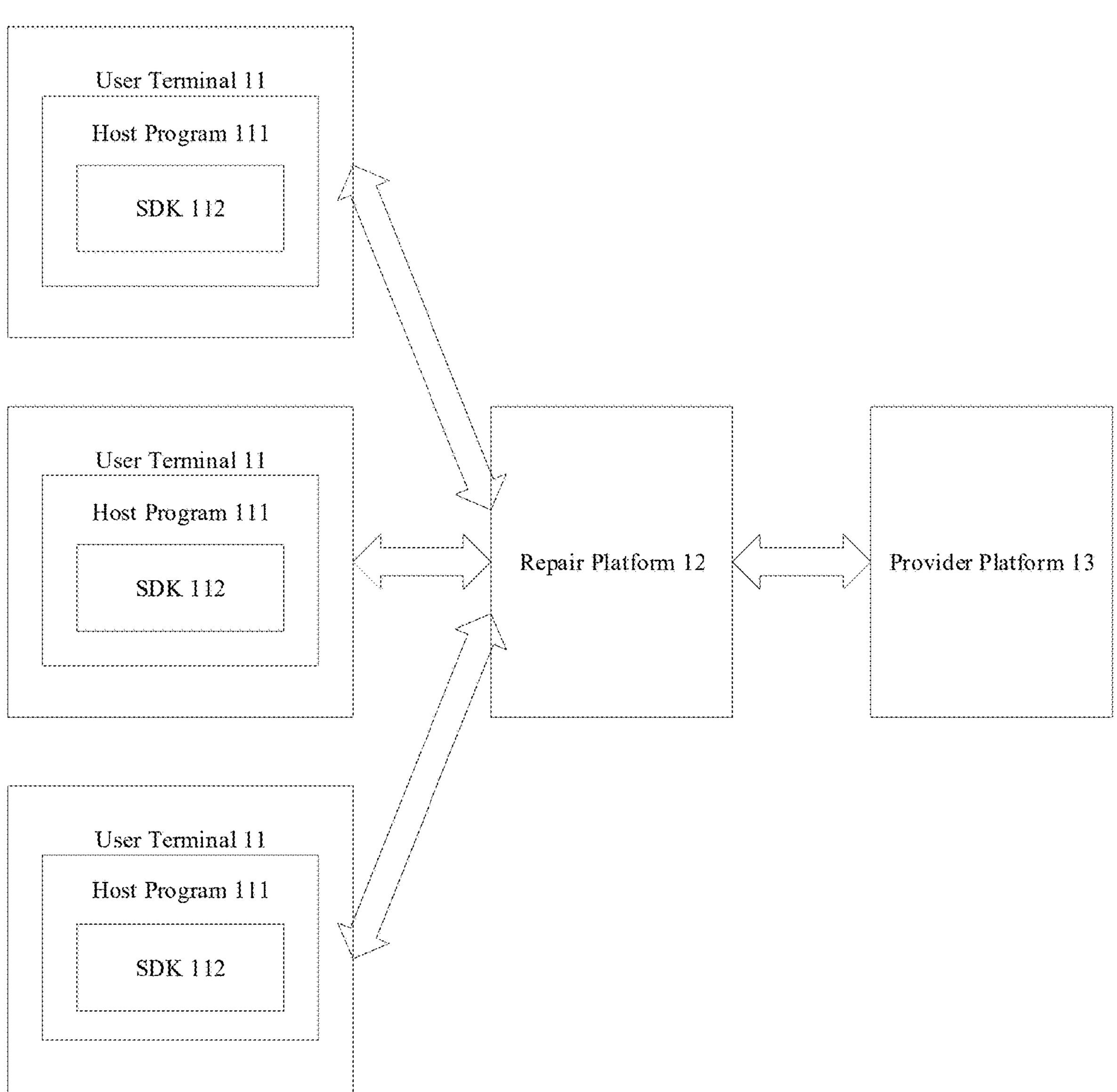
FIG. 2 is a schematic diagram of an example application scenario of another SDK repair method, according to some embodiments of the disclosure.

In some embodiments, the SDK repair methods disclosed herein may also involve a provider platform. FIG. 2 is a schematic diagram of an example application scenario of another SDK repair method, according to some embodiments of the disclosure. As shown in FIG. 2, a provider platform 13 may communicate and interact with the repair platform 12.

The provider platform 13 may be an audit platform for SDK repair policies, and may include more than one electronic device. An electronic device may include a device such as a server, a gateway, a router, etc., and the type and number of electronic devices in the provider platform 13 are not limited here. Each content provider may open an account on the provider platform 13, and audit an SDK repair policy, provided for an SDK 112 embedded in a host program 11 of the content provider, through the provider platform 13. An SDK repair policy provided for an SDK 112 embedded in a host program 111 may be first sent to the provider platform 13 corresponding to the host program 111 for review. After the provider platform 13 has approved the SDK repair policy, the repair platform 13 may send the SDK repair policy to the user terminal 11. In some embodiments, the provider platform 13 may also provide SDK anomaly information to the repair platform 12.

In the following, the SDK repair method, apparatus, terminal, device, system and medium provided in the present disclosure will be described respectively.

A first aspect of the disclosure provides an SDK repair method, which may be applied to a repair platform, that is, the SDK repair method may be executed by the repair platform. FIG. 3 is a flowchart of an SDK repair method, according to embodiments of the first aspect of the disclosure. As shown in FIG. 3, the SDK repair method may include Steps S201 to S204.

Step S201: Obtain SDK information, host information and SDK anomaly information of different anomaly types.

SDK information includes basic information of an SDK, for example, SDK information may include an SDK version, etc., which is not limited here. SDK information may indicate the SDK version. Host information includes information of the host program in which the SDK is embedded, for example, host information may include the host program identifier, the identifier of the content provider to which the host program belongs, host program environment information, etc., which is not limited here. Host information may indicate a host program, and the host program has a corresponding relationship with a content provider. Anomaly type is the anomaly type of SDK, and the anomaly type may be set according to scenarios, demands, experience, etc. For example, an anomaly type may include but is not limited to a data anomaly type, a file input and output anomaly type, a business unreachable anomaly type, a crash anomaly type, etc. One SDK anomaly information corresponds to one SDK anomaly. One SDK anomaly information includes information related to one anomaly of SDK, for example, one SDK anomaly information may include SDK anomaly description information, the content provider identifier of the host program in which the SDK is embedded where the SDK anomaly occurs, whether there is content provider feedback on the SDK anomaly, SDK online time, user(s) affected by the SDK anomaly, terminal type(s) affected by SDK anomaly, business success rate of the SDK where the anomaly occurs, business importance of the SDK where the anomaly occurs, etc., which are not limited here.

In some embodiments, the SDK anomaly information includes first SDK anomaly information and/or second SDK anomaly information, where the first SDK anomaly information is provided by a user terminal, and the second SDK anomaly information is provided by the provider platform. Furthermore, the first SDK anomaly information may be provided by the SDK in which the SDK anomaly occurs in the user terminal. The first SDK anomaly information may be obtained from the log of the SDK in the user terminal. The second SDK anomaly information may be obtained from the log of the provider platform. The first SDK anomaly information may also include tracking point information, so that the location, time, cause, etc., of the SDK anomaly may be traced back in the subsequent analysis process. The second SDK anomaly information may be the anomaly information, runtime information, etc., entered by the technicians affiliated with the provider platform.

Step S202: Determine an anomaly impact index corresponding to each anomaly type of a target SDK according to the SDK information, the host information and the SDK anomaly information of each anomaly type.

The target SDK corresponds to the host program indicated by the host information and the SDK version indicated by the SDK information. The target SDK may be determined according to the host information and the SDK information. Different target SDKs may have different SDK anomaly information corresponding to these target SDKs, and different SDK anomaly information may represent different SDK anomalies that affect the SDK program. The anomaly impact index may represent the degree of impact of the SDK anomaly on the SDK. The anomaly impact index corresponding to each anomaly type of the target SDK indicates the degree of impact of the SDK anomaly of the anomaly type on the target SDK. The anomaly impact indices corresponding to different anomaly types of different target SDKs may be different, such as the anomaly impact indices corresponding to different anomaly types of SDKs of different versions in different host programs may be different. The anomaly impact indices corresponding to the same anomaly type of different target SDKs may be different, such as the anomaly impact indices corresponding to the same anomaly type of SDK of different versions in different host programs may be different, the anomaly impact indices corresponding to the same anomaly type of SDK of the same version in different host programs may be different, and the anomaly impact indices corresponding to the same anomaly type of SDK of different versions in the same host program may be different.

The anomaly impact index may be an index calculated using a standardized algorithm that may characterize the degree of impact of an SDK anomaly on an SDK, that is, the anomaly impact index is standardized and comparable. For example, the anomaly impact indices corresponding to different anomaly types of different target SDKs are comparable. In some embodiments, corresponding calculated values and weights may be set in advance for at least some SDK anomaly information to establish a unified standard, so that the anomaly impact indices corresponding to different anomaly types under different target SDKs calculated using a weighted algorithm are standardized and comparable.

Step S203: Obtain a target SDK repair policy according to an anomaly impact index corresponding to each anomaly type of the target SDK and a preset anomaly grading processing rule.

The anomaly grading processing rule may include a correspondence between the anomaly type, anomaly impact index, anomaly level and SDK repair policy. The target SDK repair policy includes an SDK repair policy, in the anomaly grading processing rule, with an anomaly level corresponding to an anomaly impact index. That is, according to the anomaly impact index corresponding to each anomaly type of the target SDK, the anomaly level and SDK repair policy corresponding to the anomaly type and anomaly impact index of the target SDK may be determined according to the anomaly grading processing rule, and the determined SDK repair policy may be used as the target SDK repair policy.

The anomaly level may reflect the severity of the anomaly, and different anomaly levels correspond to different target SDK repair policies. The higher the severity of the anomaly, the higher the repair degree of the SDK repair policy required to repair the anomaly. Similarly, if the severity of the anomaly is low, the anomaly may be repaired by using an SDK repair policy with a lower repair degree. In other words, the higher the severity of the anomaly, the higher the repair degree of the SDK repair policy corresponding to the anomaly level.

The anomaly grading processing rule may record multiple SDK repair policies. Different SDK repair policies have different repair degrees. Different SDK repair policies may repair SDK anomalies of different severities. The anomaly grading processing rule may be used to select an appropriate SDK repair policy for the target SDK. For example, suppose there are two SDKs, e.g., SDK1 and SDK2. Through the anomaly types and anomaly impact indices of the two SDKs, it is determined that the anomaly level of SDK1 is level 3 and the anomaly level of SDK2 is level 1. The severity of the anomaly with level 3 is higher than the severity of the anomaly with level 1. Therefore, an SDK repair policy with a higher repair degree is assigned to SDK1, and an SDK repair policy with a lower repair degree is assigned to SDK2.

In some embodiments, the target SDK repair policy may include, but is not limited to, one or more of the following: a first file, a second file, and a third file.

The first file includes a cache data clearing instruction, which is used to instruct the clearing of data in at least one cache folder corresponding to the target SDK. The cache data clearing instruction may also be subdivided into sub-instructions of different levels according to the relative degree of repair. For example, the cache data clearing instruction includes a first sub-instruction and a second sub-instruction. The first sub-instruction may be used to instruct the clearing of data in a particular cache folder corresponding to the target SDK, and the second sub-instruction may be used to instruct the clearing of data in all cache folders corresponding to the target SDK. The second sub-instruction has a more advanced repair procedure than the first sub-instruction. The cache data clearing instruction may be implemented through an instruction statement, and the type of instruction statement is not limited here.

The second file includes an anomaly source blocking instruction. The anomaly source blocking instruction is used to instruct to set the on/off state of at least one service function and/or sub-service function of the target SDK to an off state. The SDK may have multiple service functions, each of which may also have at least one sub-service function, and the service functions and sub-service functions may be in a tree structure. Correspondingly, the on/off state of the service functions and the on/off state of the sub-service functions may also be in a tree structure, and each service function and sub-service function may be turned on or off by setting the on/off state of the respective function.

The anomaly source blocking instruction may be divided into different anomaly source blocking instructions according to the relative degree of repair. Different anomaly levels may be obtained for different anomaly types and anomaly impact indices. Different anomaly source blocking instructions may be assigned to different anomaly levels. Different anomaly source blocking instructions instruct turning off different service functions and/or sub-service functions. For example, when the anomaly level is level 2, the anomaly source blocking instruction in the second file instructs the on/off state of both service function 1 and service function 2 in the target SDK to be set to an off state. When the anomaly level is level 1, the anomaly source blocking instruction in the second file instructs the on/off state of service function 1 in the target SDK to be set to an off state. In some embodiments, the content of setting the on/off state of the service functions by the anomaly source blocking instruction may be implemented as a string, such as "111110", which means that the on/off state of the sixth service function among six service functions is set to an off state. The anomaly source blocking instruction may perform configuration actions when the service functions and/or sub-service functions are initialized.

The third file includes a patch file, which is used to upgrade and repair the target SDK. The patch file includes a difference file between a pre-repair SDK archive file and a post-repair SDK archive file. The patch file may repair the part(s) of the SDK that needs to be repaired. In some embodiments, the third file may be an apk file.

In some embodiments, the target SDK repair policy includes a third file. The repair platform may generate a patch file. Specifically, the repair platform may obtain the pre-repair SDK archive file and the post-repair SDK archive file of the target SDK; obtain a first class file and a second class file, where the first class file includes a class file in the pre-repair SDK archive file, and the second class file includes a class file in the post-repair SDK archive file; use a comparison algorithm to compare the first class file and the second class file to obtain a third class file, where the third class file includes a class file indicating a difference between the second class file and the first class file; and convert the third class file into the patch file.

The pre-repair SDK archive file and the post-repair SDK archive file may be an arr file or a jar file. If the pre-repair SDK archive file and the post-repair SDK archive file are arr files, the arr files may be decompressed to extract the jar files. A jar file includes a class file and a manifest file. The jar files may be decompressed to extract the class files, that is, the first class file and the second class file are obtained. The third class file may be compressed into a jar file, and the third class file may be converted into a dex file through the Gradle transform application program interface (API). The dex file is a patch file. The dex file is readable, that is, when the dex file is scanned, readable statement, class, etc., may be obtained from it, which may facilitate the review by an auditor, and there will be no situation where it cannot be restored to a readable statement and cannot be reviewed.

The third file may implement a hot fix for the SDK. For SDKs of different versions embedded in different host programs, the patch files in the third file may be different.

The first file, the second file, and the third file may also be combined with each other. In some embodiments, the repair degree of a target SDK repair policy obtained by combining two or more files is higher than the repair degree of a target SDK repair policy corresponding to any one of the two or more files. For example, the repair degree of a target SDK repair policy including the first file and the second file is higher than the repair degree of a target SDK repair policy including just the first file.

Step S204: Deliver the target SDK repair policy to a user terminal, so that the user terminal executes the target SDK repair policy to repair the target SDK.

Specifically, the repair platform may send the target SDK repair policy to a user terminal where the target SDK is located. The number of user terminals where the target SDK is located is not limited here. The repair platform may send the target SDK repair policy to all user terminals where the target SDK is located, or use grayscale delivery to send the target SDK repair policy to the user terminals where the target SDK is located in batches, or send the target SDK repair policy to the specified user terminals where the target SDK is located. The target SDK repair policy may be sent to a user terminal in the form of a file or another form, which is not limited here.

After a user terminal obtains the target SDK repair policy, the user terminal executes the target SDK repair policy to repair the target SDK.

In some embodiments, the user terminal may establish a repair process specifically for executing the target SDK repair policy, that is, the target SDK repair policy is executed by the repair process. The repair process is independent of the target SDK processing. Even if the target SDK processing is interrupted, the repair process may record the repair progress and is not affected by the interruption of the target SDK processing. When the target SDK processing is started again, the repair may continue according to the repair progress without restarting the repair, which improves the efficiency of SDK repair.

In some embodiments of the disclosure, the repair platform may obtain an anomaly impact index that characterizes the impact of an anomaly type on the SDK according to the SDK information, host information and the collected SDK anomaly information of different anomaly types, so as to obtain an SDK repair policy corresponding to the anomaly level and send the obtained SDK repair policy to a user terminal according to the anomaly impact index corresponding to each anomaly type and the preset anomaly grading processing rule. The user terminal may execute the SDK repair policy corresponding to the anomaly level to repair the SDK. Different host information corresponds to different host programs, different host programs correspond to different content providers, and different versions of SDK also correspond to different SDK information. Different versions of SDK embedded in the host programs of different content providers generate different SDK anomaly information. Through the collected SDK anomaly information, an SDK repair policy corresponding to the anomaly level of each version of the SDK embedded in the host program of each content provider may be obtained, that is, SDK repair policies for the SDK of different versions embedded in the host programs of different content providers may be automatically assigned to meet the repair needs of the SDKs of different content providers.

Figure 4:
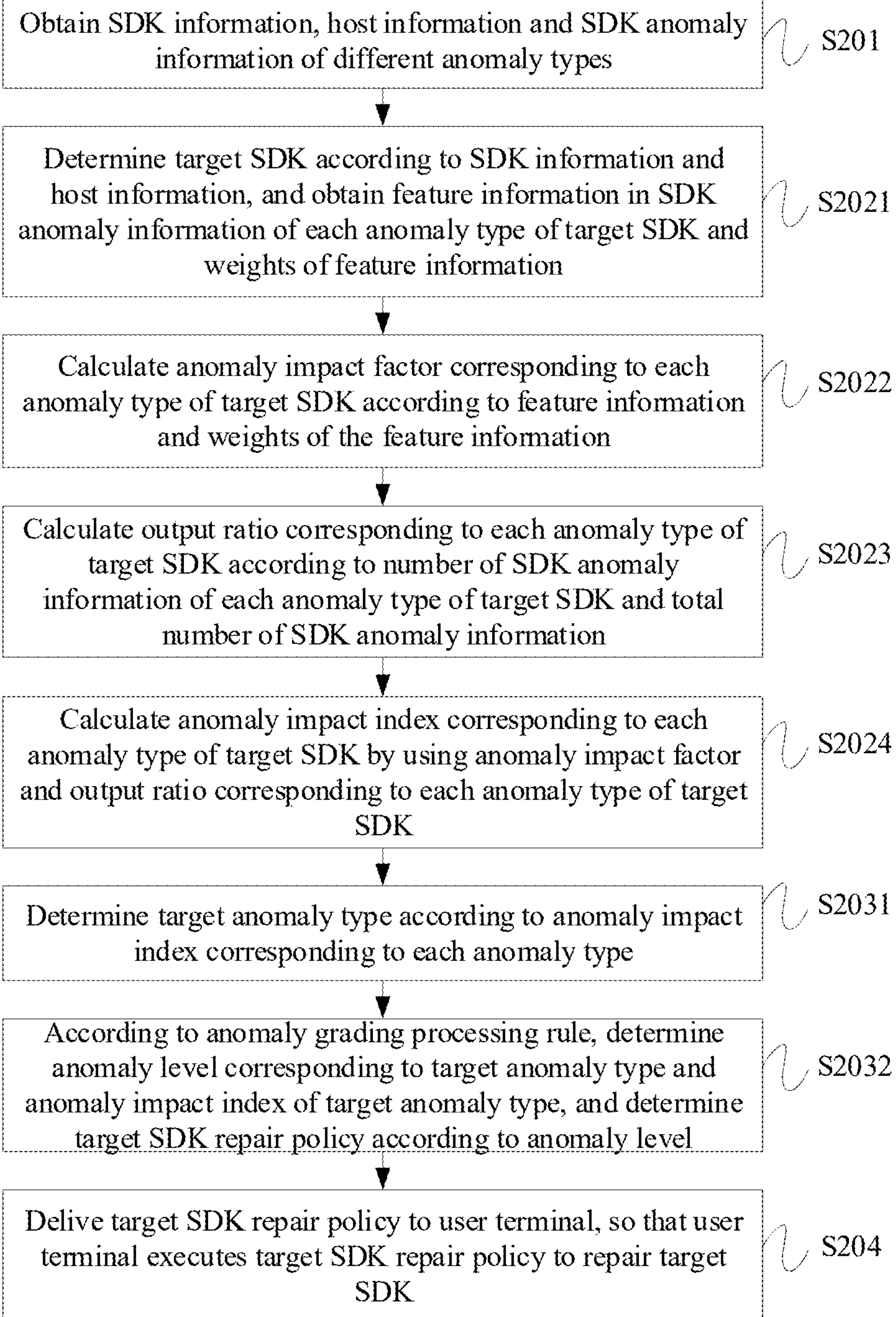
FIG. 4 is a flowchart of another SDK repair method, according to embodiments of the first aspect of the disclosure.

In some embodiments, the anomaly impact index corresponding to each anomaly type may be determined according to the impact of each anomaly type on the SDK and the number of SDK anomalies of each anomaly type that occur. The target SDK repair policy may also be determined according to an anomaly type with the largest value of the anomaly impact index, the anomaly impact index of that anomaly type, and the anomaly grading processing rule. FIG. 4 is a flowchart of another SDK repair method, according to embodiments of the first aspect of the disclosure. The difference between FIG. 4 and FIG. 3 is that Step S202 in FIG. 3 may be specifically refined into Steps S2021 to S2024 in FIG. 4, and Step S203 in FIG. 3 may be specifically refined into Steps S2031 and S2032 in FIG. 4.

Step S2021: Determine the target SDK according to the SDK information and the host information, and obtain feature information in the SDK anomaly information of each anomaly type of the target SDK and weights of the feature information.

The repair platform will obtain a large amount of SDK information, host information and SDK anomaly information. In order to provide adaptive SDK repair policies for SDKs of different versions embedded in different host programs, for a version of SDK embedded in a host program, it is necessary to obtain an SDK repair policy adapted to the SDK according to the SDK anomaly information related to the SDK.

According to the SDK information and host information, the SDK version and the host program in which the SDK is embedded may be determined, and the target SDK is determined. SDK information, host information and SDK anomaly information are obtained as a group. That is, when an anomaly occurs in the SDK, SDK information, host information and SDK anomaly information may be provided together. To determine the target SDK, the SDK anomaly information of each anomaly type of the target SDK may be summarized. In addition to the anomaly description information, the SDK anomaly information may also include feature information, which may characterize at least some features of the SDK anomaly. In some embodiments, the feature information may include, but is not limited to, the content provider identifier of the host program in which the SDK is embedded where the anomaly occurs, whether there is content provider feedback on the anomaly of the SDK, the SDK launch time, user(s) affected by the SDK anomaly, terminal type(s) affected by the SDK anomaly, the business success rate of the SDK where the anomaly occurs, the business importance of the SDK where the anomaly occurs, etc.

Weights may be set in advance for feature information, and different types of feature information may have different weights. The weights may be set according to application scenarios, requirements, experience, etc., which are not limited here. The sum of the weights of various types of feature information may be 1.

Step S2022: Calculate an anomaly impact factor corresponding to each anomaly type of the target SDK according to the feature information and the weights of the feature information.

For SDK anomaly information of an anomaly type, the product of the value of each type of feature information in the SDK anomaly information of the anomaly type and the respective weight may be calculated first, and the sum of the products may be determined as the anomaly impact factor corresponding to the anomaly type of the target SDK. In some embodiments, the value of the feature information may be the original value of the feature information. In some embodiments, the value of the feature information may also be the value obtained after processing the original value of the feature information, such as the value after normalization calculation and standardization calculation, according to a preset classification rule, or according to a category to which the original value of each type of feature information belongs, the set value under that category is determined as the value of the feature information.

For example, the feature information includes the content provider identifier of the host program in which the SDK, where the anomaly occurs, is embedded, whether there is any feedback from the content provider for the anomaly that occurs in the SDK, the business success rate of the SDK where the anomaly occurs, and the business importance of the SDK where the anomaly occurs. The content provider identifier of the host program in which the SDK where the anomaly occurs is AA, the SDK does have feedback from the content provider for the anomaly that occurs, the business success rate of the SDK where the anomaly occurs is 85%, and the business importance of the SDK where the anomaly occurs is medium. The preset classification rule may be shown in Tables 1 to 4 below. Table 1 represents the classification rule for the original value of the content provider identifier of the host program in which the SDK, where the anomaly occurs, is embedded, Table 2 represents the classification rule for the original value of whether there is any feedback from the content provider for the anomaly that occurs in the SDK, Table 3 represents the classification rule for the business success rate of the SDK where the anomaly occurs, and Table 4 represents the classification rule for the business importance of the SDK where the anomaly occurs.

TABLE 1

| Classification | AA and AB | BB |
|---|---|---|
| Settings | c1 | c2 |

TABLE 2

| Classification | Have | Not Have |
|---|---|---|
| Settings | c3 | c4 |

TABLE 3

| Classification | [0, 50%) | [50%, 75%) | [75%, 100%] |
|---|---|---|---|
| Settings | c5 | c6 | c7 |

TABLE 4

| Classification | Low | Medium | High |
|---|---|---|---|
| Settings | c8 | c9 | c10 |

If the weights corresponding to the content provider identifier of the host program in which the SDK, where the anomaly occurs, is embedded, whether there is any feedback from the content provider for the anomaly that occurs in the SDK, the business success rate of the SDK where the anomaly occurs, and the business importance of the SDK where the anomaly occurs are d1, d2, d3, and d4, respectively, then according to Table 1 to Table 4 above, the anomaly impact factor α corresponding to the anomaly type of the target SDK may be obtained according to the following Formula (1):

$$\alpha = c1 \times d1 + c3 \times d2 + c7 \times d3 + c9 \times d4 \tag{1}$$

The anomaly impact factor corresponding to an anomaly type may represent the impact of the SDK anomaly of the anomaly type on the SDK. The impact reflects the impact of the anomaly type on the SDK in aspects of feature information.

Step S2023: Calculate an output ratio corresponding to each anomaly type of the target SDK according to the number of SDK anomaly information of each anomaly type of the target SDK and the total number of the SDK anomaly information.

The output ratio corresponding to an anomaly type of the target SDK may represent the proportion of the anomaly type in all anomaly types of the target SDK. The output ratio corresponding to an anomaly type of the target SDK may be the ratio of the number of SDK anomaly information of that specific anomaly type for the target SDK to the number of SDK anomaly information of all anomaly types for the target SDK. For example, the target SDK has a total of n anomaly types of anomaly information, and the numbers of anomaly information of the n anomaly types are respectively $b_1$ to $b_n$, then the output ratio corresponding to the i-th anomaly type may be obtained according to the following Formula (2):

$$\beta_i = \frac{b_i}{b_1 + \ldots + b_n} \tag{2}$$

where $\beta_i$ is the output ratio corresponding to the i-th anomaly type, $b_1$ is the number of anomaly information of the first anomaly type, $b_i$ is the number of anomaly information of the i-th anomaly type, $1 \le i \le n$, and $b_n$ is the number of anomaly information of the n-th anomaly type.

Step S2024: Calculate the anomaly impact index corresponding to each anomaly type of the target SDK by using the anomaly impact factor and the output ratio corresponding to each anomaly type of the target SDK.

In addition to reflecting the impact of the anomaly type on the SDK in the aspects of feature information, the anomaly impact index may also reflect the impact of the anomaly type on the SDK in the aspects of the proportion of all anomaly types in the SDK. The product of the anomaly impact factor corresponding to an anomaly type of the target SDK and the output ratio corresponding to the anomaly type may be used as the anomaly impact index corresponding to the anomaly type of the target SDK. For example, the anomaly impact index corresponding to the i-th anomaly type may be obtained according to the following Formula (3):

$$E(i) = \alpha_i \times \beta_i \quad (3)$$

where E(i) is the anomaly impact index corresponding to the i-th anomaly type, a $\alpha_i$ is the anomaly impact factor corresponding to the i-th anomaly type, and $\beta_i$ is the output ratio corresponding to the i-th anomaly type.

Step S2031: Determine a target anomaly type according to the anomaly impact index corresponding to each anomaly type.

The target anomaly type is the anomaly type corresponding to an anomaly impact index with the largest value. For example, assuming that the target SDK corresponds to SDK anomaly information with four anomaly types, the values of the anomaly impact indices corresponding to the first anomaly type to the fourth anomaly type are f1, f2, f3 and f4, respectively. If f2<f4<f1<f3, the target anomaly type is the third anomaly type.

Step S2032: According to the anomaly grading processing rule, determine the anomaly level corresponding to the target anomaly type and the anomaly impact index of the target anomaly type, and determine the target SDK repair policy according to the anomaly level.

The anomaly impact index corresponding to each anomaly type of the target SDK indicates the degree of influence of the SDK anomaly of this anomaly type on the target SDK. The anomaly type corresponding to an anomaly impact index with the largest value has the greatest impact on the target SDK among all anomaly types. The target anomaly type and the anomaly impact index corresponding to the target anomaly type may reflect which anomaly type of the SDK anomaly mainly causes the impact on the target SDK, and the degree of influence of the SDK anomaly of this anomaly type on the target SDK. Different target anomaly types and anomaly impact indices with different values may correspond to different anomaly levels according to the anomaly grading processing rule, and the corresponding target SDK repair policies may also be different.

For example, suppose that the anomaly types include four types of anomalies: data anomaly type, file input/output anomaly type, business unreachable anomaly type, and crash anomaly type. If the target anomaly type is a data anomaly type or a file input/output anomaly type, the anomaly level may be a minor level, and the corresponding target SDK repair policy may include the first file in the above described embodiments. If the target anomaly type is a business unreachable anomaly type, the anomaly level may be a medium level, and the corresponding target SDK repair policy may include the second file in the above described embodiments. If the target anomaly type is a crash anomaly type, the anomaly level may be a severe level, and the corresponding target SDK repair policy may include the third file in the above described embodiments.

In some embodiments, in order to make the target SDK repair policy sent to a user terminal to be effective only for the target SDK, a signature that may reflect the host program (e.g., the content provider) may be added to the target SDK repair policy. Specifically, the target SDK repair policy may also include a first signature file. The repair platform may generate a first signature according to the host information, and generate a first signature file according to the first signature, and the first signature file includes the first signature. The signature algorithm for generating the first signature is not limited here. For example, the first signature may be generated according to the host information using ShangMi 3 (SM3) signature algorithm.

After the user terminal obtains the target SDK repair policy, the user terminal may determine the target SDK pointed to by the target SDK repair policy by verifying the first signature, and then execute the target SDK repair policy to repair the target SDK. The host program may be called to verify the first signature. If the verification is successful, it means that the host program has the target SDK, and the target SDK embedded in the host program may be repaired. If the verification fails, it means that the host program does not have the target SDK, and the SDKs embedded in the host program will not be repaired.

Figures 5, 6:
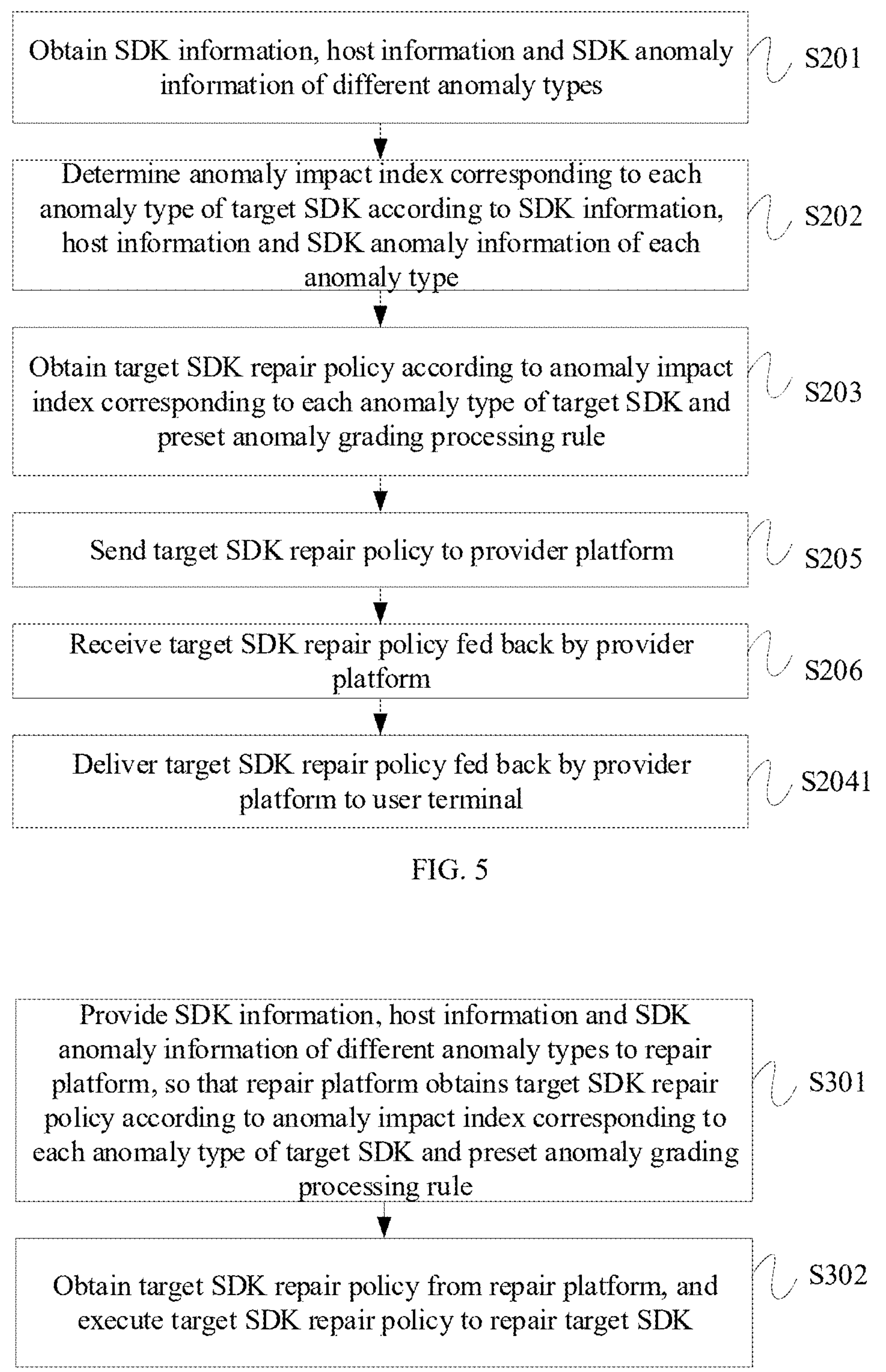
FIG. 5 is a flowchart of yet another SDK repair method, according to embodiments of the first aspect of the disclosure.
FIG. 6 is a flowchart of an SDK repair method, according to embodiments of the second aspect of the disclosure.

In some embodiments, after the repair platform obtains the target SDK repair policy, the repair platform may send the target SDK repair policy to the provider platform for review. Until the provider platform passes the review, the target SDK repair policy is sent to the user terminal to ensure the security of the target SDK repair policy. FIG. 5 is a flowchart of another SDK repair method, according to embodiments of the first aspect of the disclosure. The difference between FIG. 5 and FIG. 3 is that the SDK repair method shown in FIG. 5 may also include Step S205 and Step S206, and Step S204 in FIG. 3 may be specifically refined into Step S2041 in FIG. 5.

Step S205: Send the target SDK repair policy to the provider platform.

The provider platform receives the target SDK repair policy, scans the target SDK repair policy, obtains the content of the target SDK repair policy, thereby reviews the target SDK repair policy.

If the target SDK repair policy is approved, the provider platform authorizes the target SDK repair policy, generates a second signature according to the host information, and generates a second signature file according to the second signature, where the second signature file includes the second signature. The provider platform adds the second signature file to the target SDK repair policy and feeds back the target SDK repair policy to the repair platform. In some embodiments, the provider platform may use its own signature algorithm to sign the hash value of the target SDK repair policy using the host information to obtain the second signature.

If the target SDK repair policy fails to pass the review, the provider platform will not authorize the target SDK repair policy. The provider platform may send a notification message to the repair platform to inform the repair platform that the review failed. If the provider platform scans the target SDK repair policy and finds it is not authorized, the repair platform shall not deliver the target SDK repair policy.

Step S206: Receive the target SDK repair policy fed back by the provider platform.

The fed back target SDK repair policy includes a second signature file. The second signature file includes a second signature. The second signature is generated by the provider platform according to the host information after scanning the target SDK repair policy and authorizing the policy.

Step S2041: Deliver the target SDK repair policy fed back by the provider platform to the user terminal.

The repair platform may interact with the provider platform so that the provider platform may review the target SDK repair policy. Until the provider platform passes the review, the repair platform is allowed to deliver the target SDK repair policy to the user terminal, ensuring the security of the target SDK repair policy. In addition, the provider platform may use a second signature to identify the content provider to which the host program of the target SDK belongs. When the user terminal obtains the target SDK repair policy, the user terminal may use the host information of the host program to verify the second signature. The target SDK repair policy is effective only for the target SDK in the host program that has passed the signature verification, so as to ensure the targeted effectiveness of the target SDK repair policy.

A second aspect of the disclosure provides an SDK repair method, which may be applied to a user terminal, that is, the SDK repair method may be executed by the user terminal. FIG. 6 is a flowchart of an SDK repair method, according to embodiments of the second aspect of the disclosure. As shown in FIG. 6, the SDK repair method may include Step S301 and Step S302.

Step S301: Provide SDK information, host information and SDK anomaly information of different anomaly types to a repair platform, so that the repair platform obtains a target SDK repair policy according to an anomaly impact index corresponding to each anomaly type of the target SDK and a preset anomaly grading processing rule.

The target SDK repair policy includes an SDK repair policy, in the anomaly grading processing rule, with an anomaly level corresponding to an anomaly impact index. The target SDK corresponds to the host program indicated by the host information and the SDK version indicated by the SDK information. The anomaly impact index corresponding to each anomaly type of the target SDK is obtained according to the SDK information, the host information and the SDK anomaly information of each anomaly type.

Step S302: Obtain a target SDK repair policy from the repair platform, and execute the target SDK repair policy to repair the target SDK.

In some embodiments, when the target SDK is initialized, it may establish a repair process and send host information, SDK information, user information, etc., to the repair platform. The repair platform may find a target SDK repair policy corresponding to the host information and SDK information according to the host information and SDK information, and deliver the target SDK repair policy. The user terminal downloads the target SDK repair policy from the repair platform, and executes the target SDK repair policy through a repair process to repair the target SDK.

In some embodiments, the target SDK repair policy includes, but is not limited to, one or more of the following: a first file, a second file, and a third file.

The first file includes a cache data clearing instruction, which is used to instruct to clear data in at least one cache folder corresponding to the target SDK. When the target SDK repair policy includes the first file, the user terminal may clear the dirty read in the cache folder of the target SDK according to the cache data clearing instruction.

The second file includes an anomaly source blocking instruction, which is used to instruct to set the on/off state of at least one service function and/or sub-service function of the target SDK to an off state. In the case where the target SDK repair policy includes the second file, the user terminal may set the on/off state of the at least one service function and/or sub-service function indicated by the anomaly source blocking instruction to an off state according to the anomaly source blocking instruction.

The third file includes a patch file, which is used to upgrade and repair the target SDK. When the target SDK repair policy includes the third file, the user terminal may extract the patch file in the third file and load the repaired class in a class loading manner to complete the repair of the target SDK.

In some embodiments, the target SDK repair policy includes a third class file, and the patch file is converted from the third class file. The third class file includes a class file indicating a difference between a second class file and a first class file, where the first class file includes a class file in the pre-repair SDK archive file of the target SDK, and the second class file includes a class file in the post-repair SDK archive file of the target SDK.

The specific contents of the first file, the second file and the third file may be found in the relevant descriptions in the above embodiments, which will not be repeated here.

The specific contents of the above Step S301 and Step S302 may be found in the relevant descriptions in the above embodiments, which will not be repeated here.

In some embodiments of the disclosure, the repair platform may obtain an anomaly impact index that characterizes the impact of an anomaly type on the SDK according to the SDK information, host information and the collected SDK anomaly information of different anomaly types, so as to obtain an SDK repair policy corresponding to the anomaly level and send the obtained SDK repair policy to a user terminal according to the anomaly impact index corresponding to each anomaly type and the preset anomaly grading processing rule. The user terminal may execute the SDK repair policy corresponding to the anomaly level to repair the SDK. Different host information corresponds to different host programs, different host programs correspond to different content providers, and different versions of SDK also correspond to different SDK information. Different versions of SDK embedded in the host programs of different content providers generate different SDK anomaly information. Through the collected SDK anomaly information, an SDK repair policy corresponding to the anomaly level of each version of the SDK embedded in the host program of each content provider may be obtained, that is, SDK repair policies for the SDK of different versions embedded in the host programs of different content providers may be automatically assigned to meet the repair needs of the SDKs of different content providers.

In some embodiments, the anomaly impact index corresponding to each anomaly type of the target SDK is calculated using the anomaly impact factor and output ratio corresponding to each anomaly type of the target SDK. The output ratio corresponding to each anomaly type of the target SDK is calculated according to the number of SDK anomaly information of each anomaly type of the target SDK and the total number of the SDK anomaly information. The anomaly impact factor corresponding to each anomaly type of the target SDK is calculated according to the feature information in the SDK anomaly information of each anomaly type of the target SDK, and the weights of the feature information. The specific content of this part may be found in the relevant descriptions in the above embodiments, which will not be repeated here.

In some embodiments, the anomaly level corresponding to the target SDK repair policy is obtained according to the anomaly grading processing rule, the target anomaly type and the anomaly impact index of the target anomaly type, where the target anomaly type is the anomaly type corresponding to an anomaly impact index with the largest value. The specific content of this part may be found in the relevant descriptions in the above embodiments, which will not be repeated here.

In some embodiments, the target SDK repair policy also includes a first signature file, the first signature file includes a first signature, and the first signature is generated by the repair platform according to the host information. For specific content, refer to the relevant descriptions in the above embodiments, which will not be repeated here.

After obtaining the target SDK repair policy from the repair platform, the user terminal may call the host program indicated by the host information to verify the first signature. When the host program indicated by the host information successfully verifies the first signature, the target SDK repair policy is executed to repair the target SDK. The verification algorithm for the first signature may be agreed upon in advance with the repair platform by the user terminal, which is not limited here. The repair platform may generate the first signature using an agreed private key, and the user terminal may verify the first signature using an agreed public key. On one hand, the verification may verify the integrity of the target SDK repair policy and whether the target SDK repair policy has been tampered with. On the other hand, verification may also verify the uniqueness of the target SDK repair policy to the host program, i.e., the content provider, thereby ensuring the content security of the target SDK repair policy and the access security of the content provider.

In some embodiments, the target SDK repair policy also includes a second signature file, and the second signature file includes a second signature. The second signature is generated by the provider platform according to the host information after scanning the target SDK repair policy and granting authorization. For specific content, refer to the relevant descriptions in the above embodiments, which will not be repeated here. FIG. 7 is a flowchart of anther SDK repair method, according to embodiments of the second aspect of the disclosure. The difference between FIG. 7 and FIG. 6 is that Step S302 in FIG. 6 may be specifically refined into Steps S3021 to S3023 in FIG. 7.

Step S3021: Obtain the target SDK repair policy from the repair platform.

Step S3022: Call a host program indicated by the host information to verify the second signature.

The verification algorithm for the second signature may be agreed upon in advance by the user terminal and the provider platform, and is not limited here. The provider platform may generate the second signature using an agreed private key, and the user terminal may verify the second signature using an agreed public key. On one hand, the integrity of the target SDK repair policy and whether it has been tampered with may be verified. On the other hand, the uniqueness of the target SDK repair policy to the host program, i.e., the content provider, may also be verified. On the third hand, the approval of the target SDK repair policy by the content provider may be verified, thereby ensuring the content security of the target SDK repair policy and the access security of the content provider.

Step S3023: When the host program indicated by the host information successfully verifies the second signature, execute the target SDK repair policy to repair the target SDK.

Figure 8:
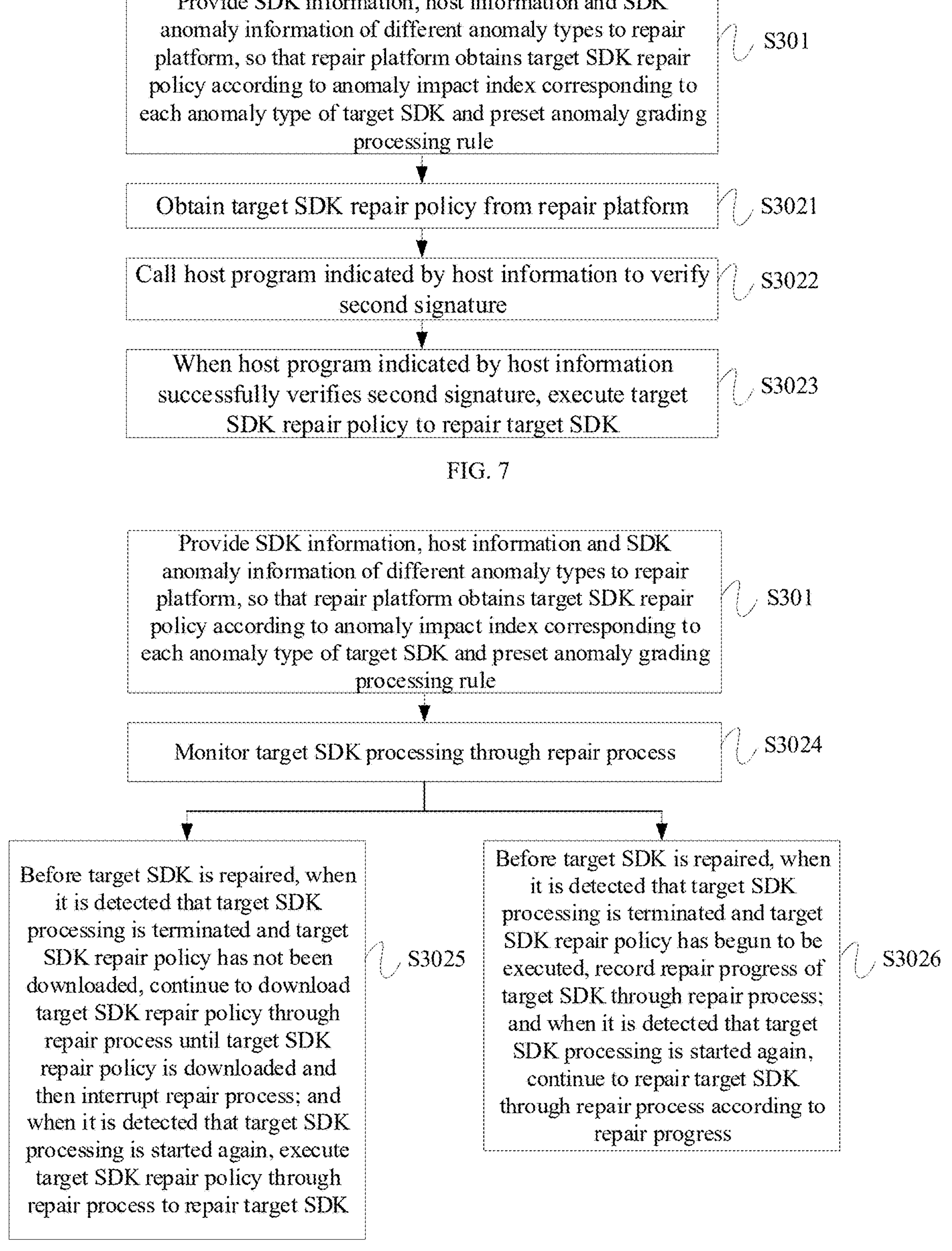
FIG. 8 is a flowchart of yet another SDK repair method, according to embodiments of the second aspect of the disclosure.

In some embodiments, the user terminal may establish a repair process, obtain the target SDK repair policy from the repair platform through the repair process, and execute the target SDK repair policy through the repair process to repair the target SDK. The repair process is independent of the target SDK processing, which may minimize the impact of the target SDK processing on the repair of the SDK and improve the repair efficiency of the SDK. FIG. 8 is a flowchart of another SDK repair method, according to embodiments of the second aspect of the disclosure. The difference between FIG. 8 and FIG. 6 is that Step S302 in FIG. 6 may be specifically refined into Steps S3024 to S3026 in FIG. 8.

Step S3024: Monitor a target SDK processing through the repair process.

Step S3025: Before the target SDK is repaired, when it is detected that the target SDK processing is terminated and the target SDK repair policy has not been downloaded, continue to download the target SDK repair policy through the repair process until the target SDK repair policy is downloaded and then interrupt the repair process; and when it is detected that the target SDK processing is started again, execute the target SDK repair policy through the repair process to repair the target SDK.

After downloading the target SDK repair policy, the content that mainly plays a repair role in the target SDK repair policy may be encrypted and saved, for example, the cache data clearing instruction, anomaly source blocking instruction, patch file, etc., may be encrypted and saved.

If the repair process is interrupted for other reasons during the download of the target SDK repair policy, the breakpoint resume function provided by the operating system layer of the user terminal may be used to ensure that the user terminal may obtain the complete target SDK repair policy.

Step S3026: Before the target SDK is repaired, when it is detected that the target SDK processing is terminated and the target SDK repair policy has begun to be executed, record a repair progress of the target SDK through the repair process; and when it is detected that the target SDK processing is started again, continue to repair the target SDK through the repair process according to the repair progress.

From the above, it can be seen that whether the host program or the target SDK processing is alive or not will not affect the user terminal's acquisition of the target SDK repair policy, which may ensure the effective execution of the target SDK repair policy and improve the SDK fixing rate.

Figure 9:
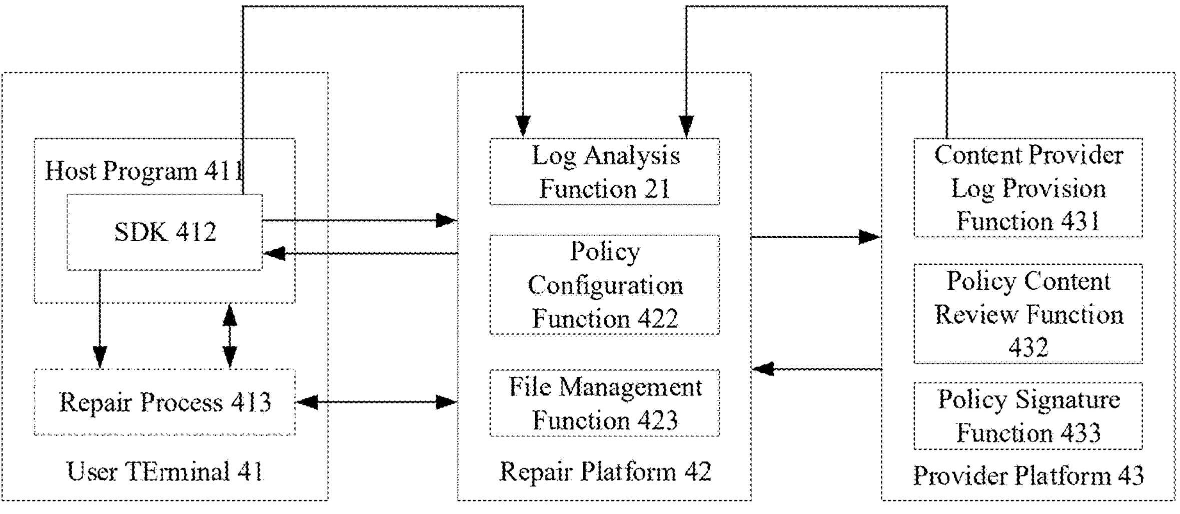
FIG. 9 is a logic diagram of an example SDK repair method, according to some embodiments of the disclosure.

For ease of understanding, the SDK repair methods are described below through a logical diagram of the interaction between the user terminal, the repair platform and the provider platform. FIG. 9 is a logical diagram of an example SDK repair method, according to some embodiments of the disclosure. As shown in FIG. 9, the user terminal 41 has a host program 411 and an SDK 412, where the SDK 412 is embedded in the host program 411. The user terminal 41 may establish a repair process 413. The repair platform 42 has a log analysis function 421, a policy configuration function 422 and a file management function 423. The provider platform 43 has a content provider log provision function 431, a policy content review function 432 and a policy signature function 433.

The repair platform 42 may obtain a log of the SDK from the SDK 412, and the log may include host information, SDK information and SDK anomaly information. The repair platform 42 may also obtain a log of the content provider from the provider platform 43, and the content provider log provision function 431 of the provider platform 43 may provide the log of the content provider. The log analysis function 421 in the repair platform 42 may extract the host information, SDK information and SDK anomaly information from the logs. The policy configuration function 422 may obtain the host information, SDK information and SDK anomaly information from the log analysis function 421, determine an anomaly level according to the host information, SDK information and SDK anomaly information, and determine a target SDK repair policy corresponding to the anomaly level. The file management function 423 manages various SDK repair policies. The policy configuration function 422 may obtain a target SDK repair policy from the file management function 423. The repair platform 42 sends the target SDK repair policy to the provider platform 43. The provider platform 43 reviews the target SDK repair policy through the policy content review function 432. If the review is passed, the target SDK repair policy is signed through the policy signature function 433, and the signed target SDK repair policy is fed back to the repair platform 42. SDK 412 may send host information and SDK information to the repair platform to trigger the repair platform 42 to provide the target SDK repair policy to the user terminal 41. SDK 412 may start a repair process 413, and the repair process 413 downloads the target SDK repair policy from the repair platform 42. The user terminal 41 verifies the signature in the target SDK repair policy through the repair process 413. After the signature verification is passed, the target SDK repair policy is executed to repair SDK 412.

It should be noted that the acquisition, storage, use, and processing of information and data in the disclosure are authorized by users or relevant entities and comply with relevant provisions of national laws and regulations.

Figure 10:
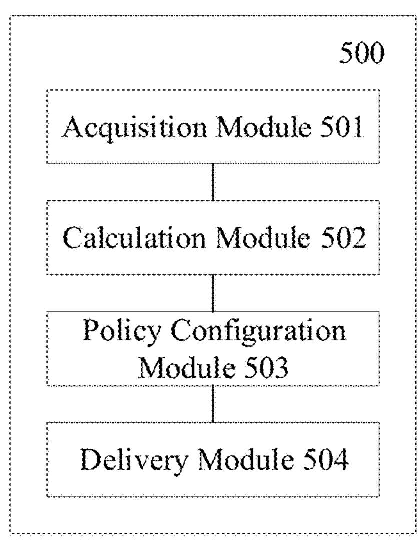
FIG. 10 is a schematic structural diagram of an SDK repair apparatus, according to embodiments of the third aspect of the disclosure.

A third aspect of the disclosure provides an SDK repair apparatus. FIG. 10 is a schematic structural diagram of an SDK repair apparatus, according to embodiments of the third aspect of the disclosure. As shown in FIG. 10, the SDK repair apparatus 500 may include an acquisition module 501, a calculation module 502, a policy configuration module 503 and a delivery module 504.

The acquisition module 501 may be configured to acquire SDK information, host information and SDK anomaly information of different anomaly types.

The calculation module 502 may be configured to obtain the anomaly impact index corresponding to each anomaly type of the target SDK according to the SDK information, the host information and the SDK anomaly information of each anomaly type.

The target SDK corresponds to the host program indicated by the host information and the SDK version indicated by the SDK information.

The policy configuration module 503 may be configured to obtain a target SDK repair policy according to the anomaly impact index corresponding to each anomaly type of the target SDK and a preset anomaly grading processing rule.

In some embodiments, the target SDK repair policy includes one or more of the following.

A first file, which includes a cache data clearing instruction, where the cache data clearing instruction is used to instruct to clear data in at least one cache folder corresponding to the target SDK.

A second file, which includes an anomaly source blocking instruction, where the anomaly source blocking instruction is used to instruct to set the on/off state of at least one service function and/or sub-service function of the target SDK to an off state.

A third file, which includes a patch file, where the patch file is used to upgrade and repair the target SDK.

The target SDK repair policy includes an SDK repair policy, in the anomaly grading processing rule, with the anomaly level corresponding to an anomaly impact index.

The delivery module is configured to deliver the target SDK repair policy to the user terminal, so that the user terminal executes the target SDK repair policy to repair the target SDK.

In some embodiments, the target SDK repair policy is executed by a repair process established by the user terminal, and the repair process is independent of the target SDK processing.

In some embodiments of the disclosure, the repair platform may obtain an anomaly impact index that characterizes the impact of an anomaly type on the SDK according to the SDK information, host information and the collected SDK anomaly information of different anomaly types, so as to obtain an SDK repair policy corresponding to the anomaly level and send the obtained SDK repair policy to a user terminal according to the anomaly impact index corresponding to each anomaly type and the preset anomaly grading processing rule. The user terminal may execute the SDK repair policy corresponding to the anomaly level to repair the SDK. Different host information corresponds to different host programs, different host programs correspond to different content providers, and different versions of SDK also correspond to different SDK information. Different versions of SDK embedded in the host programs of different content providers generate different SDK anomaly information. Through the collected SDK anomaly information, an SDK repair policy corresponding to the anomaly level of each version of the SDK embedded in the host program of each content provider may be obtained, that is, SDK repair policies for the SDK of different versions embedded in the host programs of different content providers may be automatically assigned to meet the repair needs of the SDKs of different content providers.

In some embodiments, the calculation module 502 may be configured to: determine the target SDK according to the SDK information and the host information, and obtain feature information in the SDK anomaly information of each anomaly type of the target SDK, as well as weights of the feature information; calculate an anomaly impact factor corresponding to each anomaly type of the target SDK according to the feature information and the weights of the feature information; calculate an output ratio corresponding to each anomaly type of the target SDK according to the number of SDK anomaly information of each anomaly type of the target SDK and the total number of the SDK anomaly information; and calculate an anomaly impact index corresponding to each anomaly type of the target SDK using the anomaly impact factor and output ratio corresponding to each anomaly type of the target SDK.

In some embodiments, the policy configuration module 503 may be configured to: determine a target anomaly type according to the anomaly impact index corresponding to each anomaly type, the target anomaly type being the anomaly type corresponding to an anomaly impact index with the largest value; and determine the anomaly level corresponding to the target anomaly type and the anomaly impact index of the target anomaly type according to the anomaly grading processing rule, and determine a target SDK repair policy according to the anomaly level.

In some embodiments, the target SDK repair policy includes a third file. The SDK repair apparatus 500 may also include a patch generation module.

The patch generation module may be configured to: obtain the pre-repair SDK archive file and the post-repair SDK archive file of the target SDK; obtain a first class file and a second class file, where the first class file includes a class file in the pre-repair SDK archive file, and the second class file includes a class file in the post-repair SDK archive file; use a comparison algorithm to compare the first class file and the second class file to obtain a third class file, where the third class file includes a class file indicating a difference between the second class file and the first class file; and convert the third class file into a patch file.

In some embodiments, the target SDK repair policy also includes a first signature file. The SDK repair apparatus may also include a first signature module. The first signature module may be configured to: generate a first signature according to the host information; and generate a first signature file according to the first signature, where the first signature file includes the first signature.

In some embodiments, the SDK repair apparatus may further include a receiving module.

The delivery module 504 may also be configured to send the target SDK repair policy to the provider platform.

The receiving module may be configured to: receive the target SDK repair policy fed back by the provider platform, where the fed back target SDK repair policy includes a second signature file, the second signature file includes a second signature, and the second signature is generated by the provider platform according to the host information after scanning the target SDK repair policy and authorizing the policy.

The delivery module 504 may be configured to deliver the target SDK repair policy fed back by the provider platform to the user terminal.

Figure 11:
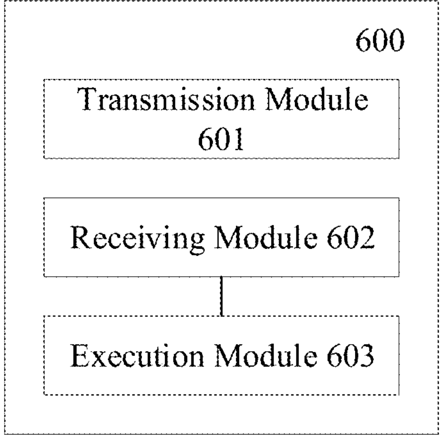
FIG. 11 is a schematic structural diagram of a user terminal, according to embodiments of the fourth aspect of the disclosure.

A fourth aspect of the disclosure provides a user terminal. FIG. 11 is a schematic structural diagram of a user terminal, according to embodiments of the fourth aspect of the disclosure. As shown in FIG. 11, the user terminal 600 may include a transmission module 601, a receiving module 602 and an execution module 603.

The transmission module 601 may be configured to provide SDK information, host information and SDK anomaly information of different anomaly types to the repair platform, so that the repair platform may obtain a target SDK repair policy according to the anomaly impact index corresponding to each anomaly type of the target SDK and a preset anomaly grading processing rule.

The target SDK repair policy includes an SDK repair policy, in the anomaly grading processing rule, with the anomaly level corresponding to an anomaly impact index. The target SDK corresponds to the host program indicated by the host information and the SDK version indicated by the SDK information. The anomaly impact index corresponding to each anomaly type of the target SDK is obtained according to the SDK information, the host information and the SDK anomaly information of each anomaly type.

The receiving module 602 may be configured to obtain the target SDK repair policy from the repair platform.

In some embodiments, the target SDK repair policy includes one or more of the following.

A first file, which includes a cache data clearing instruction, where the cache data clearing instruction is used to instruct to clear data in at least one cache folder corresponding to the target SDK.

A second file, which includes an anomaly source blocking instruction, where the anomaly source blocking instruction is used to set the on/off state of at least one service function and/or sub-service function of the target SDK to an off state.

A third file, which includes a patch file, where the patch file is used to upgrade and repair the target SDK.

In some embodiments, the target SDK repair policy includes a third file, and the patch file is converted from a third class file, where the third class file includes a class file indicating a difference between a second class file and a first class file. The first class file includes a class file in the pre-repair SDK archive file of the target SDK, and the second class file includes a class file in the post-repair SDK archive file of the target SDK.

The execution module 603 may be configured to execute the target SDK repair policy to repair the target SDK In some embodiments of the disclosure, the repair platform may obtain an anomaly impact index that characterizes the impact of an anomaly type on the SDK according to the SDK information, host information and the collected SDK anomaly information of different anomaly types, so as to obtain an SDK repair policy corresponding to the anomaly level and send the obtained SDK repair policy to a user terminal according to the anomaly impact index corresponding to each anomaly type and the preset anomaly grading processing rule. The user terminal may execute the SDK repair policy corresponding to the anomaly level to repair the SDK. Different host information corresponds to different host programs, different host programs correspond to different content providers, and different versions of SDK also correspond to different SDK information. Different versions of SDK embedded in the host programs of different content providers generate different SDK anomaly information. Through the collected SDK anomaly information, an SDK repair policy corresponding to the anomaly level of each version of the SDK embedded in the host program of each content provider may be obtained, that is, SDK repair policies for the SDK of different versions embedded in the host programs of different content providers may be automatically assigned to meet the repair needs of the SDKs of different content providers.

In some embodiments, the anomaly impact index corresponding to each type of anomaly of the target SDK is calculated using an anomaly impact factor and an output ratio corresponding to each anomaly type of the target SDK. The output ratio corresponding to each anomaly type of the target SDK is calculated according to the number of SDK anomaly information of each anomaly type of the target SDK and the total number of the SDK anomaly information of the target SDK. The anomaly impact factor corresponding to each anomaly type of the target SDK is calculated according to the feature information in the SDK anomaly information of each anomaly type of the target SDK, and the weights of the feature information.

In some embodiments, the anomaly level corresponding to the target SDK repair policy is obtained according to the anomaly grading processing rule, the target anomaly type and the anomaly impact index of the target anomaly type. The target anomaly type is the anomaly type corresponding to an anomaly impact index with the largest value.

In some embodiments, the target SDK repair policy also includes a first signature file, where the first signature file includes a first signature, and the first signature is generated by the repair platform according to the host information.

The execution module 603 may also be configured to: call the host program indicated by the host information to verify the first signature, and if the host program indicated by the host information successfully verifies the first signature, execute the target SDK repair policy to repair the target SDK.

In some embodiments, the target SDK repair policy also includes a second signature file, the second signature file includes a second signature, and the second signature is generated by the provider platform according to the host information after scanning the target SDK repair policy and granting the authorization.

The execution module 603 may also be configured to: call the host program indicated by the host information to verify the second signature, and if the host program indicated by the host information successfully verifies the second signature, execute the target SDK repair policy to repair the target SDK.

In some embodiments, the execution module 603 may be configured to: establish a repair process, which is independent of the target SDK processing, obtain the target SDK repair policy from the repair platform through the repair process, and execute the target SDK repair policy to repair the target SDK.

In some embodiments, the execution module 603 may be configured to: monitor the target SDK processing through a repair process; before the target SDK is repaired, when it is detected that the target SDK processing is terminated and the target SDK repair policy has not been downloaded, continue to download the target SDK repair policy through the repair process until the target SDK repair policy is downloaded, and then interrupt the repair process; and when it is detected that the target SDK processing is started again, execute the target SDK repair policy through the repair process to repair the target SDK; before the target SDK is repaired, when it is detected that the target SDK processing is terminated and the target SDK repair policy has started to be executed, record a repair progress of the target SDK through the repair process, and when it is detected that the target SDK processing is started again, continue to repair the target SDK according to the repair progress through the repair process.

Figure 12:
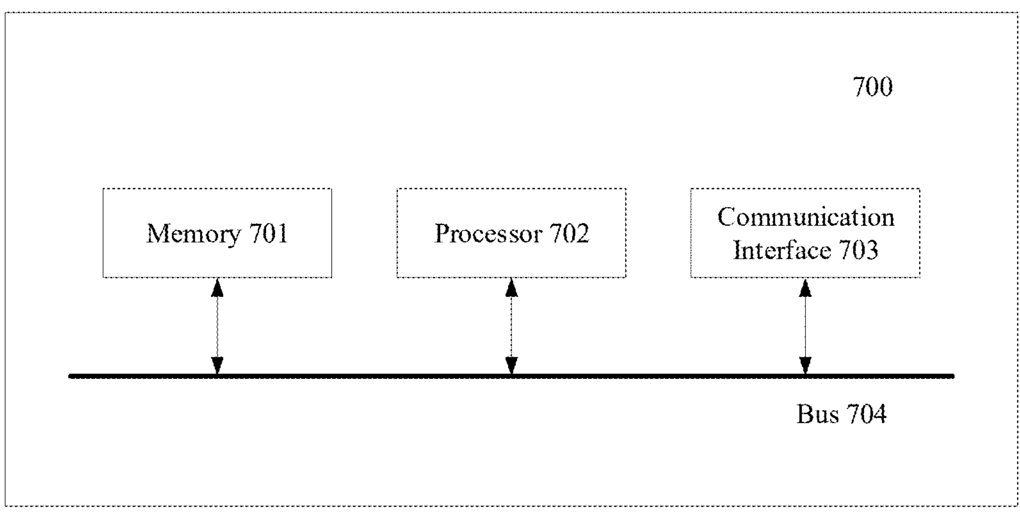
FIG. 12 is a schematic structural diagram of an electronic device, according to embodiments of the fifth aspect of the disclosure.

A fifth aspect of the disclosure also provides an electronic device. FIG. 12 is a schematic structural diagram of an electronic device, according to embodiments of the fifth aspect of the disclosure. As shown in FIG. 12, the electronic device 700 includes a memory 701, a processor 702, and a computer program stored in the memory 701 and executable on the processor 702.

In some embodiments, the processor 702 may include a central processing unit (CPU), or an application specific integrated circuit (ASIC), or may be configured to implement one or more SDK repair methods of the embodiments of the disclosure.

The memory 701 may include a read-only memory (ROM), a random access memory (RAM), a disk storage medium device, an optical storage medium device, a flash memory device, an electrical, optical or other physical/tangible memory storage devices. Therefore, generally, the memory includes one or more tangible (non-transitory) computer-readable storage media (e.g., a memory device) encoded with software including computer executable instructions, and when the software is executed (e.g., by one or more processors), it is operable to perform the operations described with reference to the SDK repair methods in the embodiments of the first aspect of the disclosure.

The processor 702 runs a computer program corresponding to the executable program code by reading the executable program code stored in the memory 701, so as to implement the SDK repair methods in the embodiments of the first aspect of the disclosure.

In some embodiments, the electronic device 700 may further include a communication interface 703 and a bus 704. As shown in FIG. 12, the memory 701, the processor 702, and the communication interface 703 are connected via the bus 704 and communicate with each other.

The communication interface 703 is mainly configured to realize the communication between the modules, devices, units and/or apparatuses in the embodiments of the disclosure. The communication interface 703 may also be configured to access input devices and/or output devices.

The bus 704 includes hardware or software or both, coupling the components of the electronic device 700 to each other. For example, but for not limitation, the bus 704 may include an accelerated graphics port (AGP) or other graphics buses, an enhanced industry standard architecture (EISA) bus, a front side bus (FSB), a hyper transport (HT) interconnection, an industry standard architecture (ISA) bus, an InfiniBand interconnection, a low pin count (LPC) bus, a memory bus, a micro channel architecture (MCA) bus, a peripheral component interconnect (PCI) bus, a PCI-express (PCI-E) bus, a serial advanced technology attachment (SATA) bus, a video electronics standards association local bus (VLB) bus, or other suitable buses or a combination of two or more of these. Where appropriate, the bus 704 may include one or more buses. Although embodiments of the disclosure describe and illustrate a particular bus, the disclosure contemplates any suitable bus or interconnect.

A sixth aspect of the disclosure provides a user terminal, which may include a memory, a processor, and a computer program stored in the memory and executable on the processor.

The memory includes one or more tangible (non-transitory) computer-readable storage media (e.g., memory devices) encoded with software including computer-executable instructions, and when the software is executed (e.g., by one or more processors), it is operable to perform the operations described with reference to the SDK repair methods in the embodiments of the second aspect of the disclosure.

The processor runs a computer program corresponding to the executable program code by reading the executable program code stored in the memory, so as to implement the SDK repair methods in the embodiments of the second aspect of the disclosure.

In some embodiments, the user terminal may further include a communication interface and a bus. The memory, processor, and communication interface may be connected via the bus and communicate with each other.

The connection means and specific implementation of the memory, processor, communication interface and bus may refer to the connection means and specific implementation of the memory 701, processor 702, communication interface 703 and bus 704 in the electronic device in the above embodiments, which will not be repeated here.

A seventh aspect of the disclosure provides an SDK repair system, which may include the repair platform and the user terminal in the above-described embodiments. The repair platform may execute the SDK repair methods in the embodiments of first aspect of the disclosure, and the user terminal may execute the SDK repair methods in the embodiments of the second aspect of the disclosure. For specific contents, refer to the relevant descriptions in the above-described embodiments, and the same technical effects may be achieved. To avoid repetition, the details will not be described here.

In some embodiments, the SDK repair system may also include the provider platform in the above embodiments. The provider platform may execute the steps performed by the provider platform in the above embodiments. For details, refer to the relevant instructions in the above embodiments. The same technical effects may be achieved. To avoid repetition, the details will not be repeated here.

A eighth aspect of the disclosure provides a computer-readable storage medium, on which computer program instructions are stored. When the computer program instructions are executed by the processor, the SDK repair methods in the embodiments of the first aspect or the SDK repair method in the embodiments of the second aspect may be implemented, and the same technical effects may be achieved. To avoid repetition, the details will not be repeated here. Here, the computer-readable storage medium may include a non-transitory computer-readable storage medium, such as a ROM, a RAM, a magnetic disk or an optical disk, etc., which is not limited here.

The embodiments of the disclosure may also provide a computer program product. When the instructions in the computer program product are executed by the processor of an electronic device, the electronic device executes the SDK repair methods in the embodiments of the first aspect or the SDK repair methods in the embodiments of the second aspect. For details, refer to the relevant descriptions in the above embodiments, and the same technical effects may be achieved. To avoid repetition, the details will not be repeated here.

It should be noted that embodiments in this specification are described in a progressive manner, and the same or similar parts between the embodiments may be referred to each other, and an embodiment focuses on the differences from other embodiments. For device embodiments, apparatus embodiments, user terminal embodiments, system embodiments, computer-readable storage medium embodiments, and computer program product embodiments, the relevant parts may refer to the descriptions of the method embodiments. The present disclosure is not limited to the specific steps and structures described above and shown in the figures. Those skilled in the art may make various changes, modifications and additions, or change the order between the steps after understanding the spirit of the disclosure. In addition, for the sake of brevity, a detailed description of known method technologies is omitted here.

The foregoing describes various aspects of the disclosure with reference to the flowcharts and/or block diagrams of the methods, devices (systems) and computer program products according to the embodiments of the disclosure. It should be understood that each block in the flowcharts and/or block diagrams and the combination of each block in the flowcharts and/or block diagrams may be implemented by computer program instructions. These computer program instructions may be provided to a processor of a general-purpose computer, a special-purpose computer, or other programmable data processing devices to produce a machine so that these instructions executed by the processor of the computer or other programmable data processing devices enable the implementation of the functions/actions specified in one or more blocks of the flowchart and/or block diagram. Such a processor may be, but is not limited to, a general-purpose processor, a special-purpose processor, a special application processor, or a field programmable logic circuit. It may also be understood that each block in the block diagrams and/or flowcharts and the combination of blocks in the block diagrams and/or flowcharts may also be implemented by dedicated hardware that performs a specified function or action, or may be implemented by a combination of dedicated hardware and computer instructions.

Those skilled in the art should understand that the above embodiments are exemplary rather than restrictive. Different technical features appearing in different embodiments may be combined to achieve beneficial effects. Based on the understanding of the drawings, the specification and the claims, those skilled in the art should be able to understand and implement other variations of the disclosed embodiments. In the claims, the term "comprising" does not exclude other devices or steps; the term "one" does not exclude multiple; and the terms "first" and "second" are used to indicate names rather than to indicate any specific order. Possible figure marks in the claims should not be understood as limiting the scope of protection. The functions of multiple parts appearing in the claims may be implemented by a single hardware or software module. The appearance of certain technical features in different dependent claims does not mean that these technical features cannot be combined to achieve beneficial effects.

What is claimed is:

1. An SDK repair method, applied to a user terminal, comprising:

providing SDK information, host information and SDK anomaly information of different anomaly types to a repair platform to acquire a target SDK repair policy, wherein:

the target SDK repair policy includes an SDK repair policy for a target SDK, in an anomaly grading processing rule, with an anomaly level corresponding to an anomaly impact index, the target SDK corresponds to a host program indicated by the host information and an SDK version indicated by the SDK information, and the anomaly impact index corresponding to each anomaly type of the target SDK is obtained according to the SDK information, the host information and the SDK anomaly information of each anomaly type; and establishing a repair process, wherein the repair process is independent of a target SDK processing;

monitoring the target SDK processing through the repair process;

obtaining, through the repair process, the target SDK repair policy from the repair platform, and executing the target SDK repair policy to repair the target SDK, comprising:

before the target SDK is repaired, in response to detecting that the target SDK processing is terminated and the target SDK repair policy has not been downloaded, continuing to download the target SDK repair policy through the repair process until the target SDK repair policy is downloaded and then interrupting the repair process, and in response to the target SDK processing being started again, executing the target SDK repair policy through the repair process to repair the target SDK; or before the target SDK is repaired, in response to detecting that the target SDK processing is terminated and the target SDK repair policy has begun to be executed, recording a repair progress of the target SDK through the repair process, and in response to the target SDK processing being started again, continuing to repair the target SDK through the repair process according to the repair progress.

2. The method according to claim 1, wherein:

the anomaly impact index corresponding to each type of anomaly of the target SDK is calculated using an anomaly impact factor and an output ratio corresponding to each anomaly type of the target SDK, the output ratio corresponding to each anomaly type of the target SDK is calculated according to a number of SDK anomaly information of each anomaly type of the target SDK and a total number of the SDK anomaly information, and the anomaly impact factor corresponding to each anomaly type of the target SDK is calculated according to feature information in the SDK anomaly information of each anomaly type of the target SDK and weights of the feature information.

3. The method according to claim 1, wherein the anomaly level corresponding to the target SDK repair policy is obtained according to the anomaly grading processing rule, a target anomaly type and an anomaly impact index of the target anomaly type, and the target anomaly type is an anomaly type corresponding to an anomaly impact index with a largest value.

4. The method according to claim 1, wherein the target SDK repair policy includes one or more of the following:

a first file, wherein the first file includes a cache data clearing instruction, and the cache data clearing instruction is used to instruct to clear data in at least one cache folder corresponding to the target SDK;

a second file, wherein the second file includes an anomaly source blocking instruction, and the anomaly source blocking instruction is used to instruct to set an on/off state of at least one service function and/or sub-service function of the target SDK to an off state; and a third file, where the third file includes a patch file, and the patch file is used to upgrade and repair the target SDK.

5. The method according to claim 4, wherein:

the target SDK repair policy includes the third file, the patch file is converted from a third class file, the third class file includes a class file indicating a difference between a second class file and a first class file, the first class file includes a class file in a pre-repair SDK archive file of the target SDK, and the second class file includes a class file in a post-repair SDK archive file of the target SDK.

6. The method according to claim 1, wherein:

the target SDK repair policy further includes a first signature file, the first signature file includes a first signature, and the first signature is generated by the repair platform according to the host information;

after obtaining the target SDK repair policy from the repair platform, the method further includes:

calling the host program indicated by the host information to verify the first signature; and executing the target SDK repair policy to repair the target SDK includes:

executing the target SDK repair policy to repair the target SDK when the host program indicated by the host information successfully verifies the first signature.

7. The method according to claim 1, wherein:

the target SDK repair policy further includes a second signature file, the second signature file includes a second signature, and the second signature is generated by the provider platform according to the host information after scanning the target SDK repair policy and granting authorization;

after obtaining the target SDK repair policy from the repair platform, the method further includes:

calling the host program indicated by the host information to verify the second signature; and executing the target SDK repair policy to repair the target SDK includes:

executing the target SDK repair policy to repair the target SDK when the host program indicated by the host information successfully verifies the second signature.

8. An electronic device, applied to a user terminal, the electronic device including a processor and a memory storing computer program instructions, wherein, when the processor executes the computer program instructions, the processor is configured to perform:

providing SDK information, host information and SDK anomaly information of different anomaly types to a repair platform to acquire a target SDK repair policy, wherein:

the target SDK repair policy includes an SDK repair policy for a target SDK, in an anomaly grading processing rule, with an anomaly level corresponding to an anomaly impact index, the target SDK corresponds to a host program indicated by the host information and an SDK version indicated by the SDK information, and the anomaly impact index corresponding to each anomaly type of the target SDK is obtained according to the SDK information, the host information and the SDK anomaly information of each anomaly type; and establishing a repair process, wherein the repair process is independent of a target SDK processing;

monitoring the target SDK processing through the repair process;

obtaining, through the repair process, the target SDK repair policy from the repair platform, and executing the target SDK repair policy to repair the target SDK, comprising:

before the target SDK is repaired, in response to detecting that the target SDK processing is terminated and the target SDK repair policy has not been downloaded, continuing to download the target SDK repair policy through the repair process until the target SDK repair policy is downloaded and then interrupting the repair process, and in response to the target SDK processing being started again, executing the target SDK repair policy through the repair process to repair the target SDK; or before the target SDK is repaired, in response to detecting that the target SDK processing is terminated and the target SDK repair policy has begun to be executed, recording a repair progress of the target SDK through the repair process, and in response to the target SDK processing being started again, continuing to repair the target SDK through the repair process according to the repair progress.

9. The electronic device according to claim 8, wherein the anomaly impact index corresponding to each type of anomaly of the target SDK is calculated using an anomaly impact factor and an output ratio corresponding to each anomaly type of the target SDK;

the anomaly impact factor corresponding to each anomaly type of the target SDK is calculated according to feature information and weights of the feature information; and the output ratio corresponding to each anomaly type of the target SDK is calculated according to a number of the SDK anomaly information of each anomaly type of the target SDK and a total number of the SDK anomaly information.

10. The electronic device according to claim 8, wherein the anomaly level corresponding to the target SDK repair policy is obtained according to the anomaly grading processing rule, a target anomaly type and an anomaly impact index of the target anomaly type; and the target anomaly type is an anomaly type corresponding to an anomaly impact index having a largest value.

11. The electronic device according to claim 8, wherein the target SDK repair policy includes one or more of the following:

a first file, wherein the first file includes a cache data clearing instruction, and the cache data clearing instruction is used to instruct to clear data in at least one cache folder corresponding to the target SDK;

a second file, wherein the second file includes an anomaly source blocking instruction, and the anomaly source blocking instruction is used to instruct to set an on/off state of at least one service function and/or sub-service function of the target SDK to an off state; and a third file, where the third file includes a patch file, and the patch file is used to upgrade and repair the target SDK.

12. The electronic device according to claim 11, wherein: the target SDK repair policy includes the third file, the patch file is converted from a third class file, the third class file includes a class file indicating a difference between a second class file and a first class file, the first class file includes a class file in a pre-repair SDK archive file of the target SDK, and the second class file includes a class file in a post-repair SDK archive file of the target SDK.

13. The electronic device according to claim 8, wherein: the target SDK repair policy further includes a first signature file, the first signature file includes a first signature, and the first signature is generated by the repair platform according to the host information;

after obtaining the target SDK repair policy from the repair platform, the method further includes:

calling the host program indicated by the host information to verify the first signature; and executing the target SDK repair policy to repair the target SDK includes:

executing the target SDK repair policy to repair the target SDK when the host program indicated by the host information successfully verifies the first signature.

14. The electronic device according to claim 8, wherein: the target SDK repair policy further includes a second signature file, the second signature file includes a second signature, and the second signature is generated by the provider platform according to the host information after scanning the target SDK repair policy and granting authorization;

after obtaining the target SDK repair policy from the repair platform, the method further includes:

calling the host program indicated by the host information to verify the second signature; and executing the target SDK repair policy to repair the target SDK includes:

executing the target SDK repair policy to repair the target SDK when the host program indicated by the host information successfully verifies the second signature.

15. A non-transitory computer-readable storage medium storing computer-executable instructions, the computer-executable instructions, when being executed by one or more processors, causing the one or more processors to perform:

providing SDK information, host information and SDK anomaly information of different anomaly types to a repair platform to acquire a target SDK repair policy, wherein:

the target SDK repair policy includes an SDK repair policy for a target SDK, in an anomaly grading processing rule, with an anomaly level corresponding to an anomaly impact index, the target SDK corresponds to a host program indicated by the host information and an SDK version indicated by the SDK information, and the anomaly impact index corresponding to each anomaly type of the target SDK is obtained according to the SDK information, the host information and the SDK anomaly information of each anomaly type; and establishing a repair process, wherein the repair process is independent of a target SDK processing;

monitoring the target SDK processing through the repair process;

obtaining, through the repair process, the target SDK repair policy from the repair platform, and executing the target SDK repair policy to repair the target SDK, comprising:

before the target SDK is repaired, in response to detecting that the target SDK processing is terminated and the target SDK repair policy has not been downloaded, continuing to download the target SDK repair policy through the repair process until the target SDK repair policy is downloaded and then interrupting the repair process, and in response to the target SDK processing being started again, executing the target SDK repair policy through the repair process to repair the target SDK; or before the target SDK is repaired, in response to detecting that the target SDK processing is terminated and the target SDK repair policy has begun to be executed, recording a repair progress of the target SDK through the repair process, and in response to the target SDK processing being started again, continuing to repair the target SDK through the repair process according to the repair progress.

16. The storage medium according to claim 15, wherein: the anomaly impact index corresponding to each type of anomaly of the target SDK is calculated using an anomaly impact factor and an output ratio corresponding to each anomaly type of the target SDK, the output ratio corresponding to each anomaly type of the target SDK is calculated according to a number of SDK anomaly information of each anomaly type of the target SDK and a total number of the SDK anomaly information, and the anomaly impact factor corresponding to each anomaly type of the target SDK is calculated according to feature information in the SDK anomaly information of each anomaly type of the target SDK and weights of the feature information.

17. The storage medium according to claim 15, wherein the anomaly level corresponding to the target SDK repair policy is obtained according to the anomaly grading processing rule, a target anomaly type and an anomaly impact index of the target anomaly type, and the target anomaly type is an anomaly type corresponding to an anomaly impact index with a largest value.

18. The storage medium according to claim 15, wherein the target SDK repair policy includes one or more of the following:

a first file, wherein the first file includes a cache data clearing instruction, and the cache data clearing instruction is used to instruct to clear data in at least one cache folder corresponding to the target SDK;

a second file, wherein the second file includes an anomaly source blocking instruction, and the anomaly source blocking instruction is used to instruct to set an on/off state of at least one service function and/or sub-service function of the target SDK to an off state; and a third file, where the third file includes a patch file, and the patch file is used to upgrade and repair the target SDK.

19. The storage medium according to claim 18, wherein:

the target SDK repair policy includes the third file, the patch file is converted from a third class file, the third class file includes a class file indicating a difference between a second class file and a first class file, the first class file includes a class file in a pre-repair SDK archive file of the target SDK, and the second class file includes a class file in a post-repair SDK archive file of the target SDK.

20. The storage medium according to claim 15, wherein:

the target SDK repair policy further includes a first signature file, the first signature file includes a first signature, and the first signature is generated by the repair platform according to the host information;

after obtaining the target SDK repair policy from the repair platform, the method further includes:

calling the host program indicated by the host information to verify the first signature; and executing the target SDK repair policy to repair the target SDK includes:

executing the target SDK repair policy to repair the target SDK when the host program indicated by the host information successfully verifies the first signature.

* * * * *